(12) United States Patent
Starita

(10) Patent No.: US 6,938,933 B2
(45) Date of Patent: Sep. 6, 2005

(54) CORRUGATED PLASTIC PIPE SECTIONS HAVING FLANGED ENDS AND STRUCTURALLY TIGHT JOINTS THEREOF

(76) Inventor: Joseph M. Starita, CPP Engineering LLC 447 Allenby Dr., Marysville, OH (US) 43040

( * ) Notice: Subject to any disclaimer, the term of this patent is extended or adjusted under 35 U.S.C. 154(b) by 0 days.

(21) Appl. No.: 10/698,601

(22) Filed: Oct. 31, 2003

(65) Prior Publication Data

US 2004/0108722 A1 Jun. 10, 2004

Related U.S. Application Data

(63) Continuation of application No. 09/893,846, filed on Jun. 28, 2001, now abandoned, which is a continuation-in-part of application No. 09/803,591, filed on Mar. 9, 2001, now abandoned, which is a continuation-in-part of application No. 09/794,638, filed on Feb. 27, 2001, now abandoned, which is a continuation-in-part of application No. 09/788,913, filed on Feb. 19, 2001, now abandoned, which is a continuation-in-part of application No. 09/597,338, filed on Jun. 19, 2000, now abandoned.

(51) Int. Cl.[7] .............................................. F16L 23/00
(52) U.S. Cl. ...................... 285/364; 285/365; 285/406; 285/407; 285/408; 285/903
(58) Field of Search ....................... 2853/363; 285/363, 285/364, 365, 366, 367, 406, 407, 408, 903

(56) References Cited

U.S. PATENT DOCUMENTS

| 1,043,412 | A | * | 11/1912 | Faunce ....................... 285/407 |
|---|---|---|---|---|
| 1,185,049 | A | * | 5/1916 | Best ........................... 285/406 |
| 2,065,480 | A | * | 12/1936 | Soper ....................... 285/288.5 |
| 3,406,991 | A | * | 10/1968 | Decker, Jr. et al. ......... 285/408 |
| 3,498,649 | A | * | 3/1970 | Pfeuffer ..................... 285/365 |
| 3,633,945 | A | * | 1/1972 | Press et al. ................. 285/226 |
| 4,202,568 | A | * | 5/1980 | Strom ........................ 285/336 |
| 4,288,652 | A | * | 9/1981 | Kemeny et al. .......... 174/21 C |
| 4,494,776 | A | * | 1/1985 | Press ........................... 285/55 |
| 4,537,425 | A | * | 8/1985 | Press et al. ................... 285/55 |
| 4,643,457 | A | * | 2/1987 | Press ........................... 285/55 |
| 4,819,965 | A | * | 4/1989 | Press et al. ................... 285/14 |
| 4,871,198 | A | * | 10/1989 | Hattori et al. .............. 285/373 |
| 5,053,097 | A | * | 10/1991 | Johansson et al. ......... 156/158 |
| 5,159,811 | A | * | 11/1992 | Hefler et al. ................ 60/322 |
| 5,257,834 | A | * | 11/1993 | Zeidler et al. ............. 285/328 |
| 5,687,976 | A | * | 11/1997 | Andrick et al. ............ 277/607 |
| 5,765,880 | A | * | 6/1998 | Goddard ..................... 285/231 |
| 5,865,475 | A | * | 2/1999 | Winzen et al. ............. 285/226 |
| 5,947,533 | A | * | 9/1999 | Fisher et al. ............... 285/350 |
| 6,086,110 | A | * | 7/2000 | Lee et al. ..................... 285/49 |
| 6,324,837 | B1 | * | 12/2001 | Jenne et al. ................. 60/322 |

FOREIGN PATENT DOCUMENTS

| EP | 0 100 580 A1 | * | 2/1987 | ................ 285/364 |
|---|---|---|---|---|
| FR | 414944 | * | 9/1910 | ................ 285/367 |

* cited by examiner

*Primary Examiner*—James M. Hewitt
(74) *Attorney, Agent, or Firm*—Porter, Wright, Morris & Arthur LLP

(57) ABSTRACT

Rigid corrugated plastic pipe sections are provided with a flange radially extending from at least one end of the pipe length, which allows structural and water tight joints between connecting flanged pipes and fittings to be formed in an assembly including a peripheral clamp and gasket, and a system, method and kit for effecting structural and water tight joints in corrugated plastic pipe pipes.

29 Claims, 36 Drawing Sheets

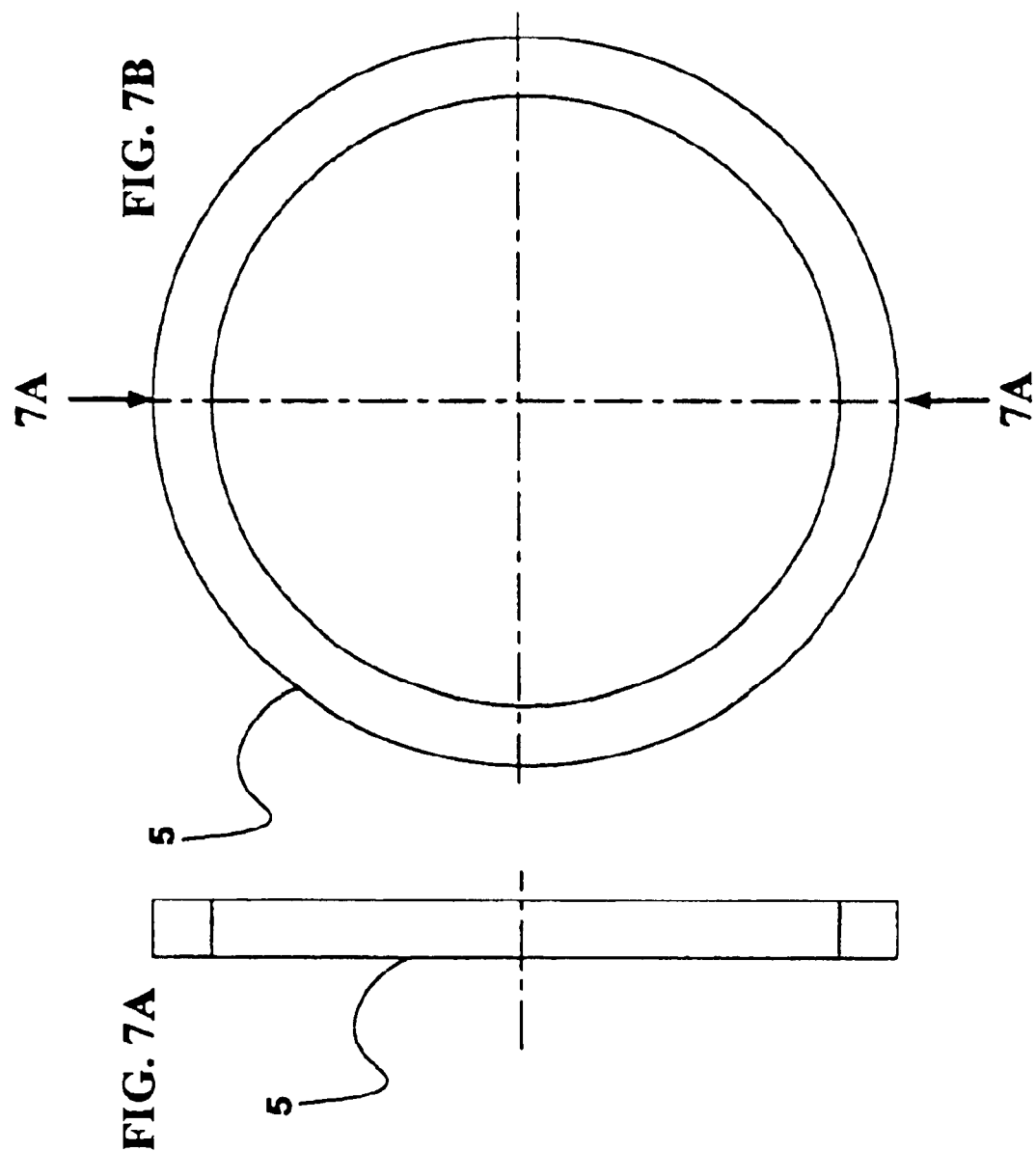

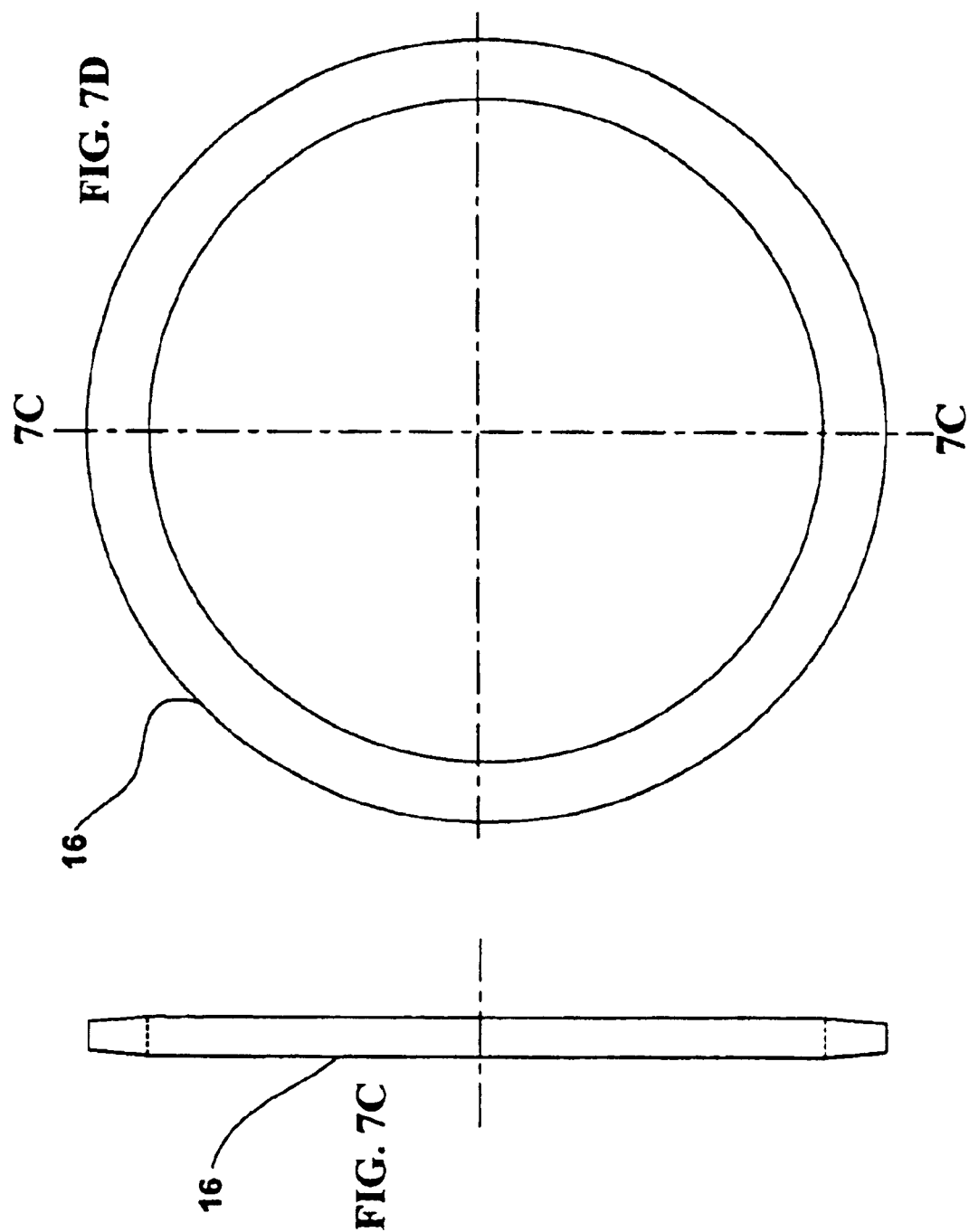

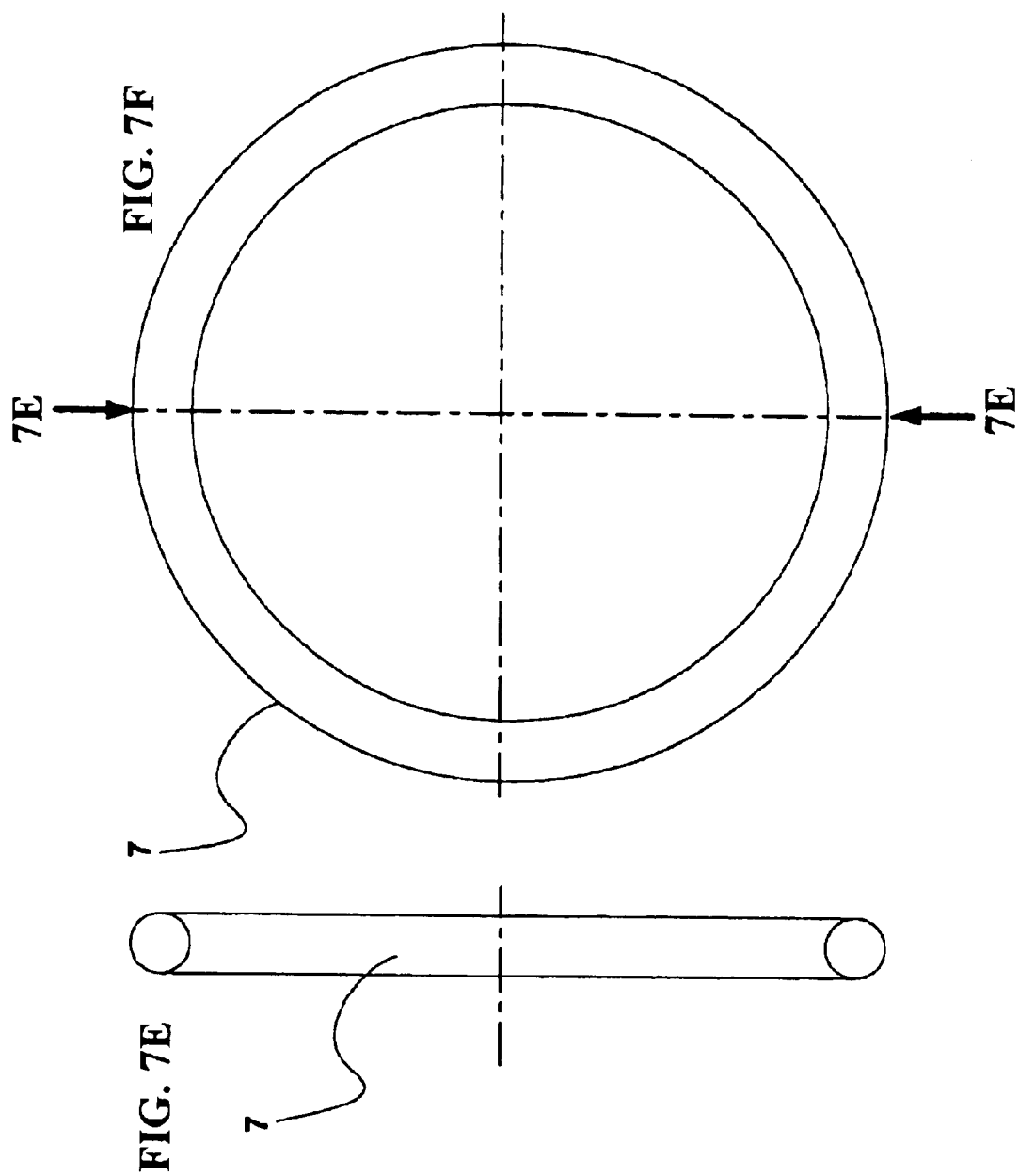

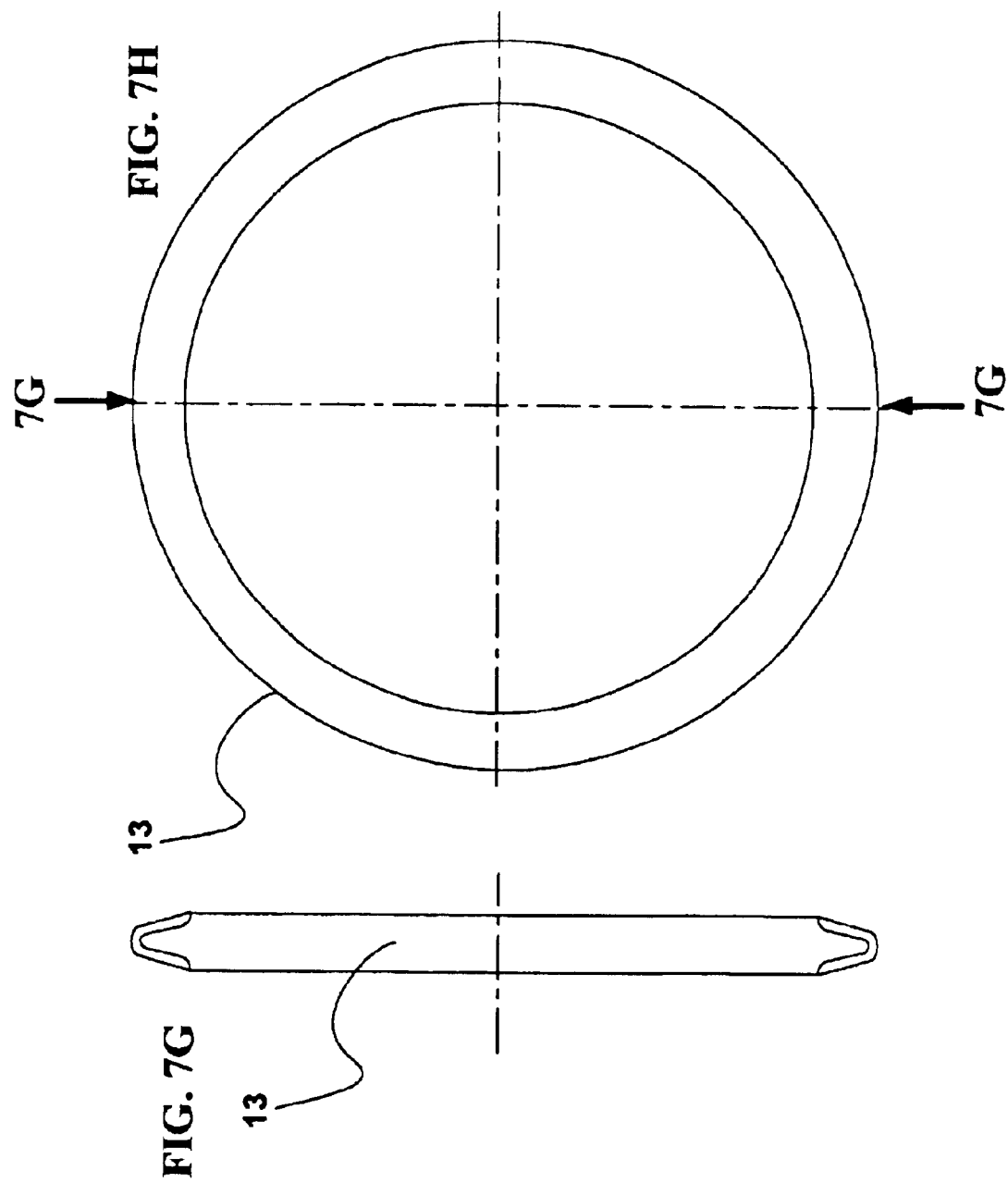

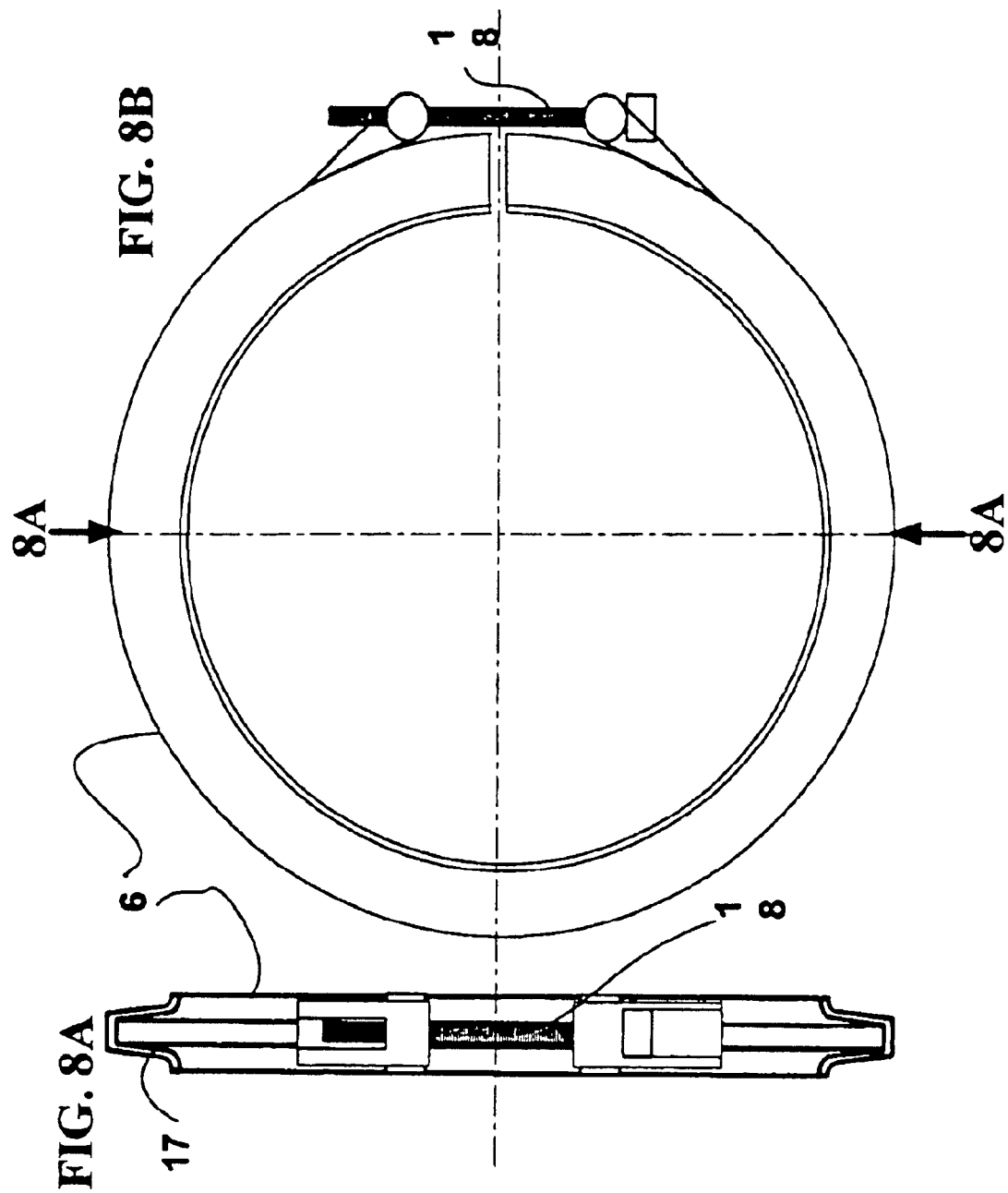

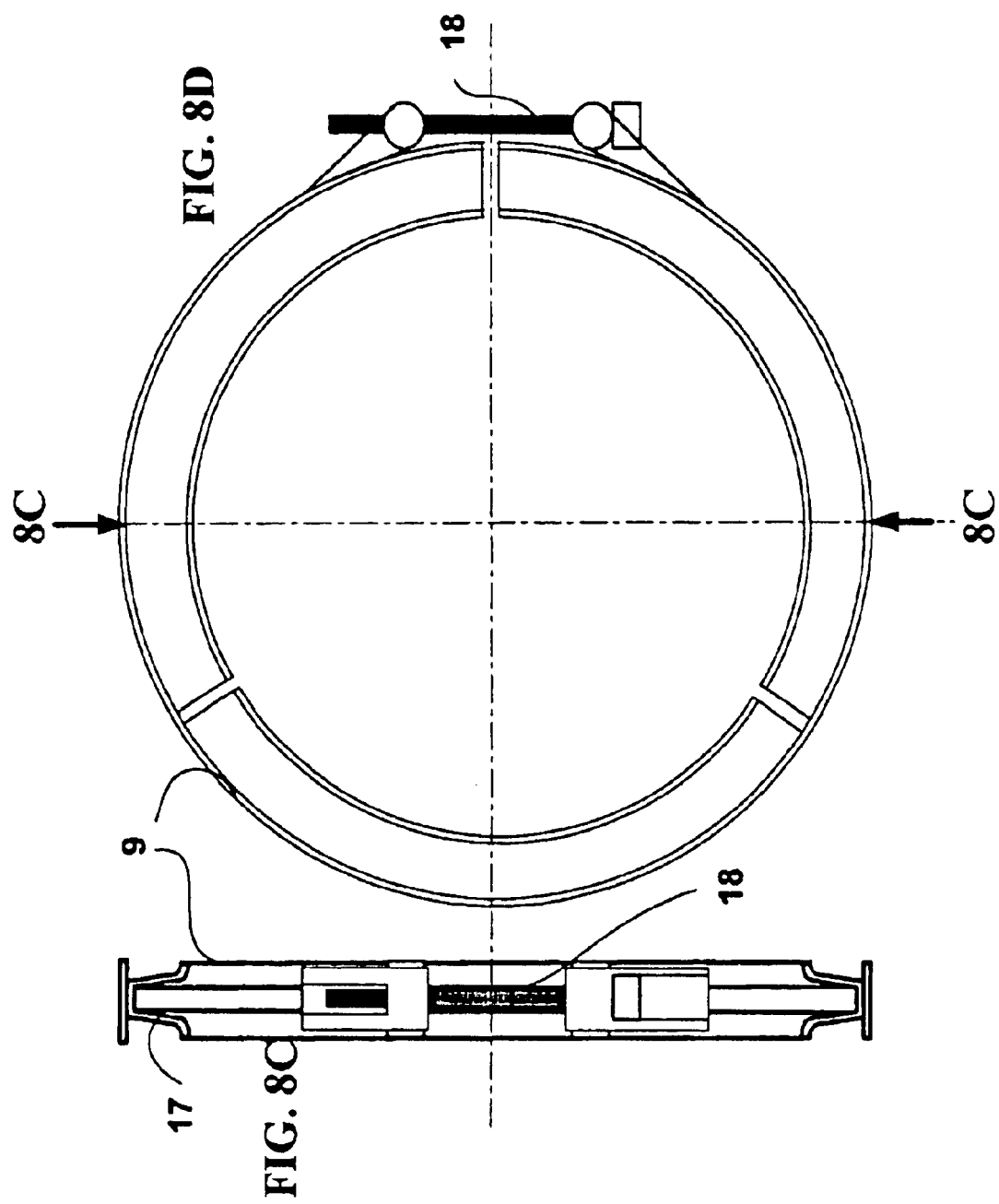

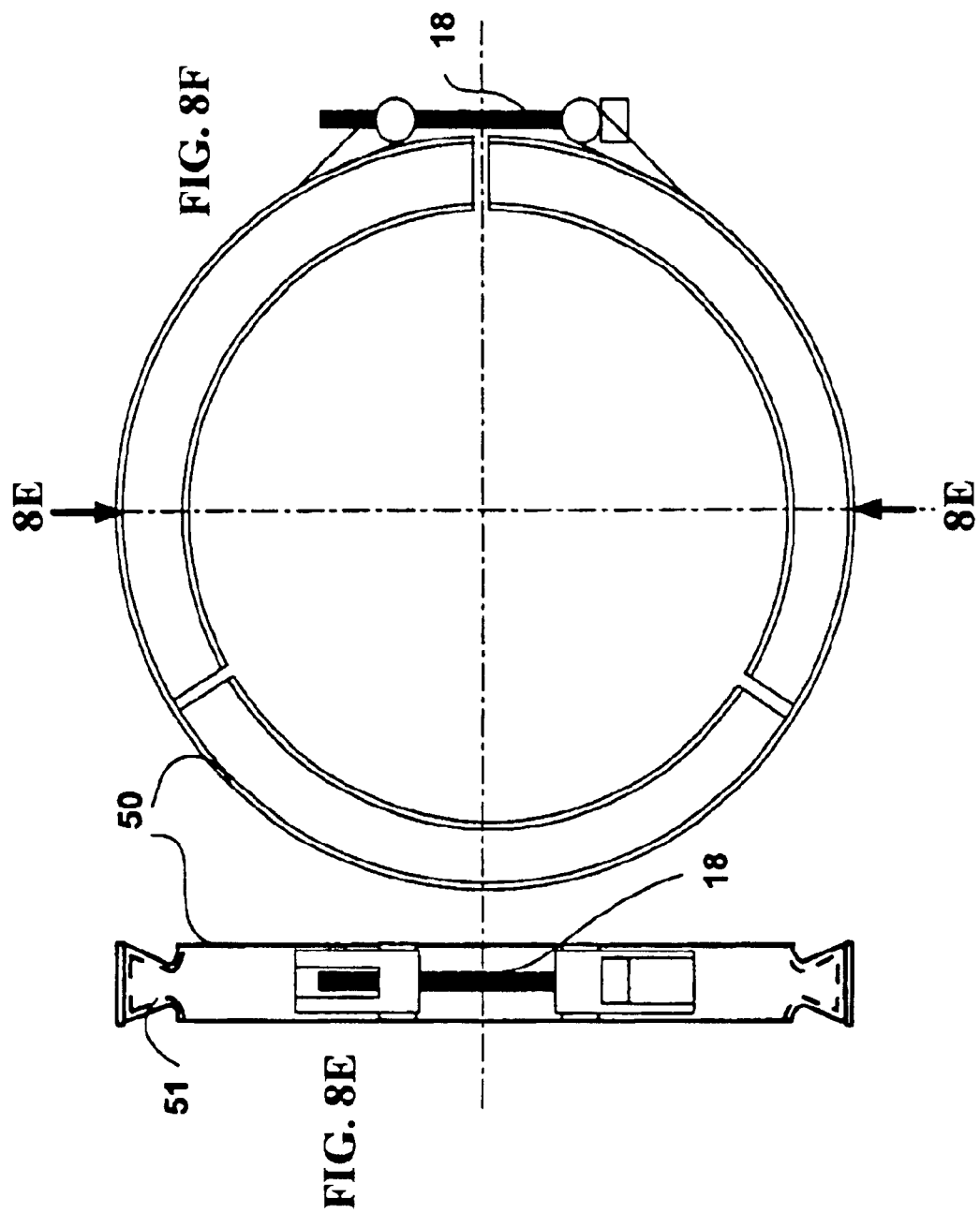

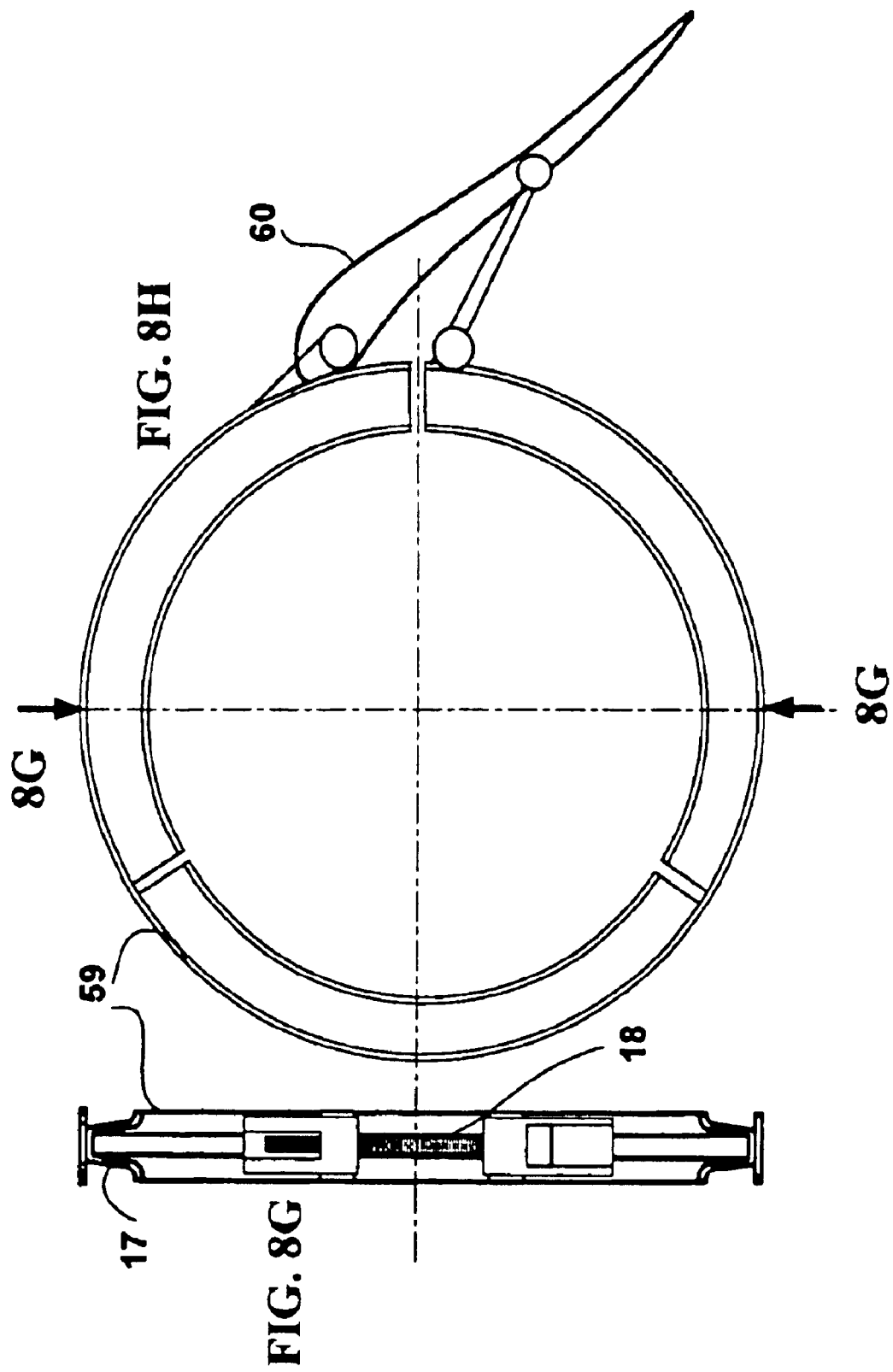

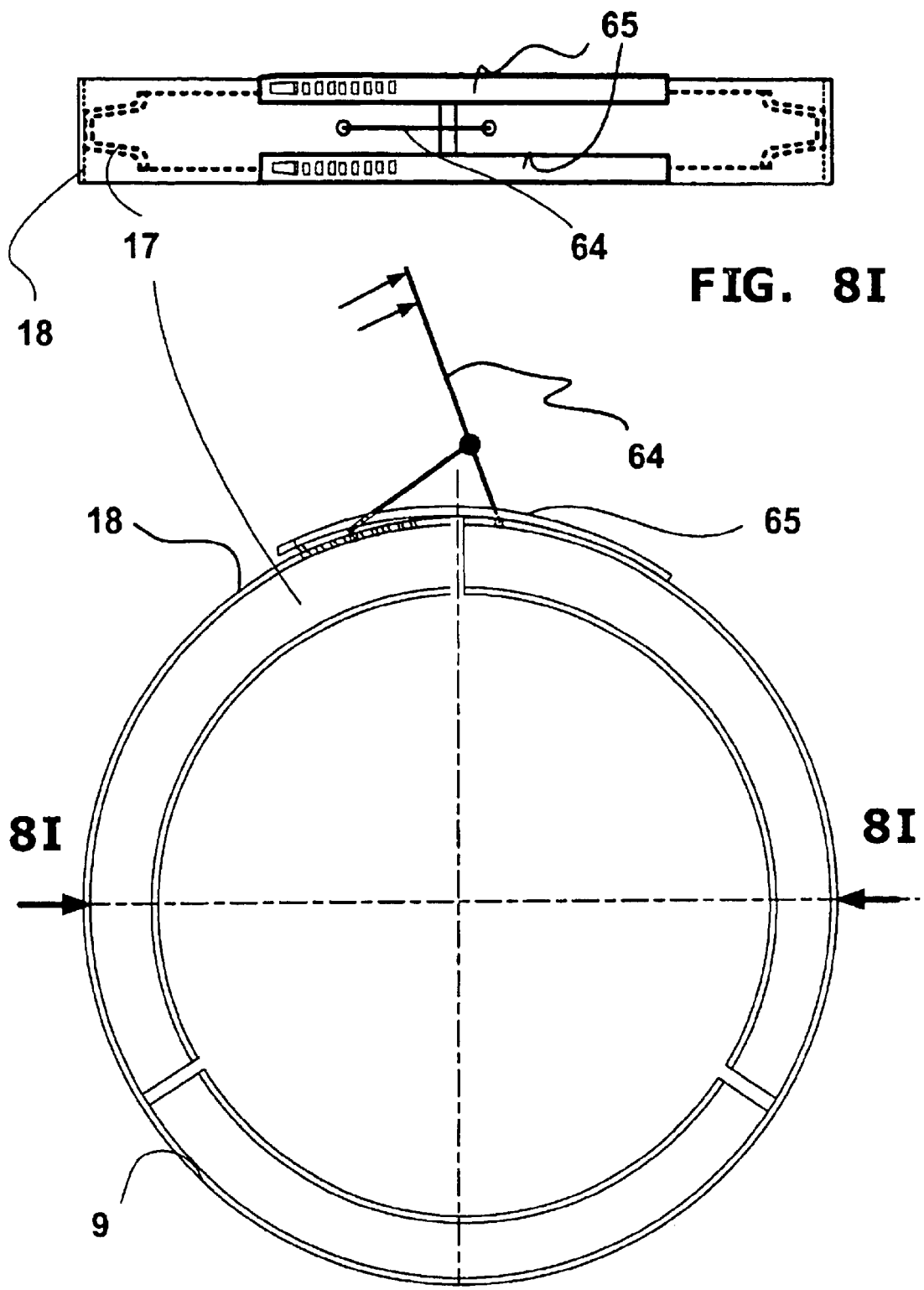

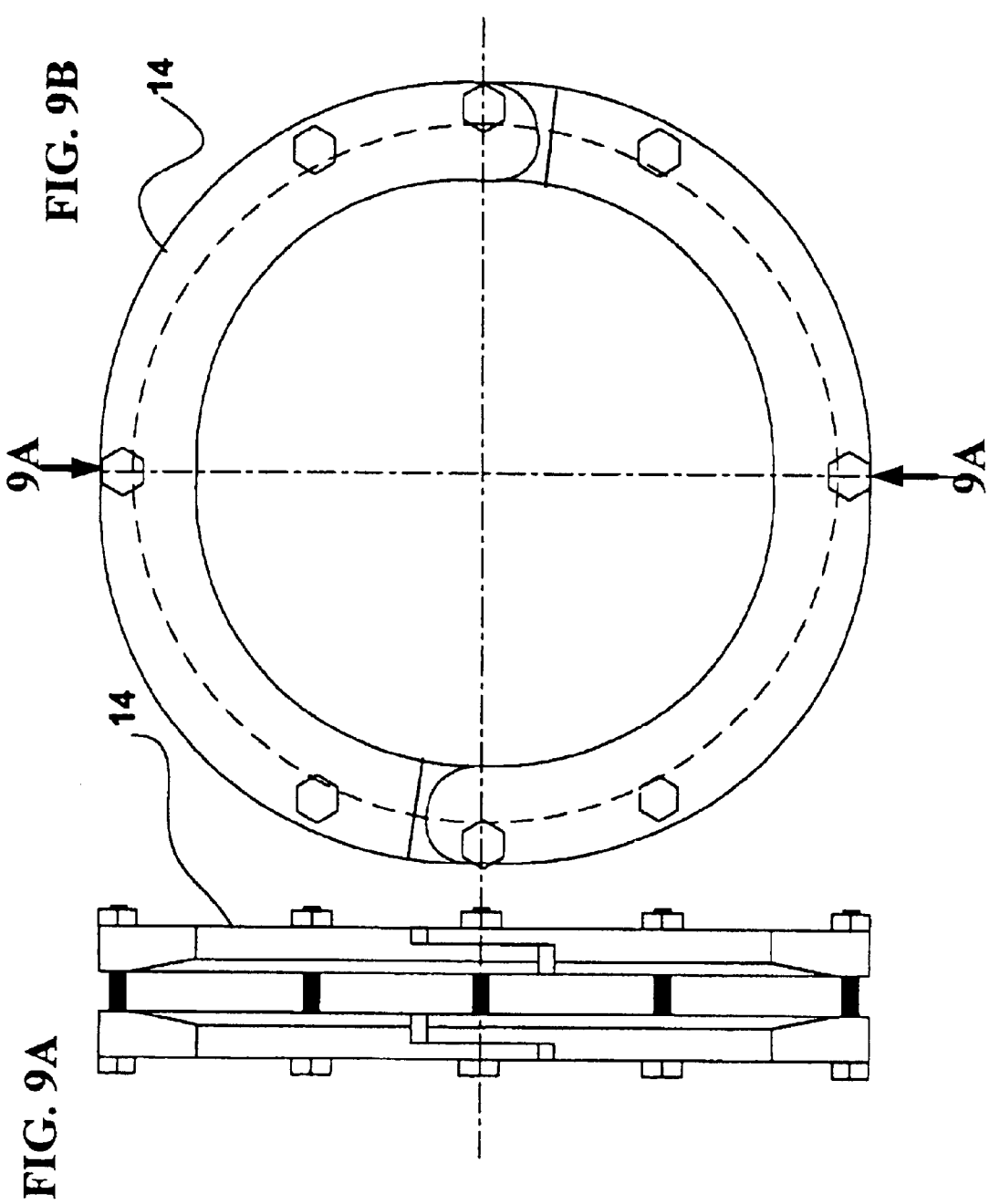

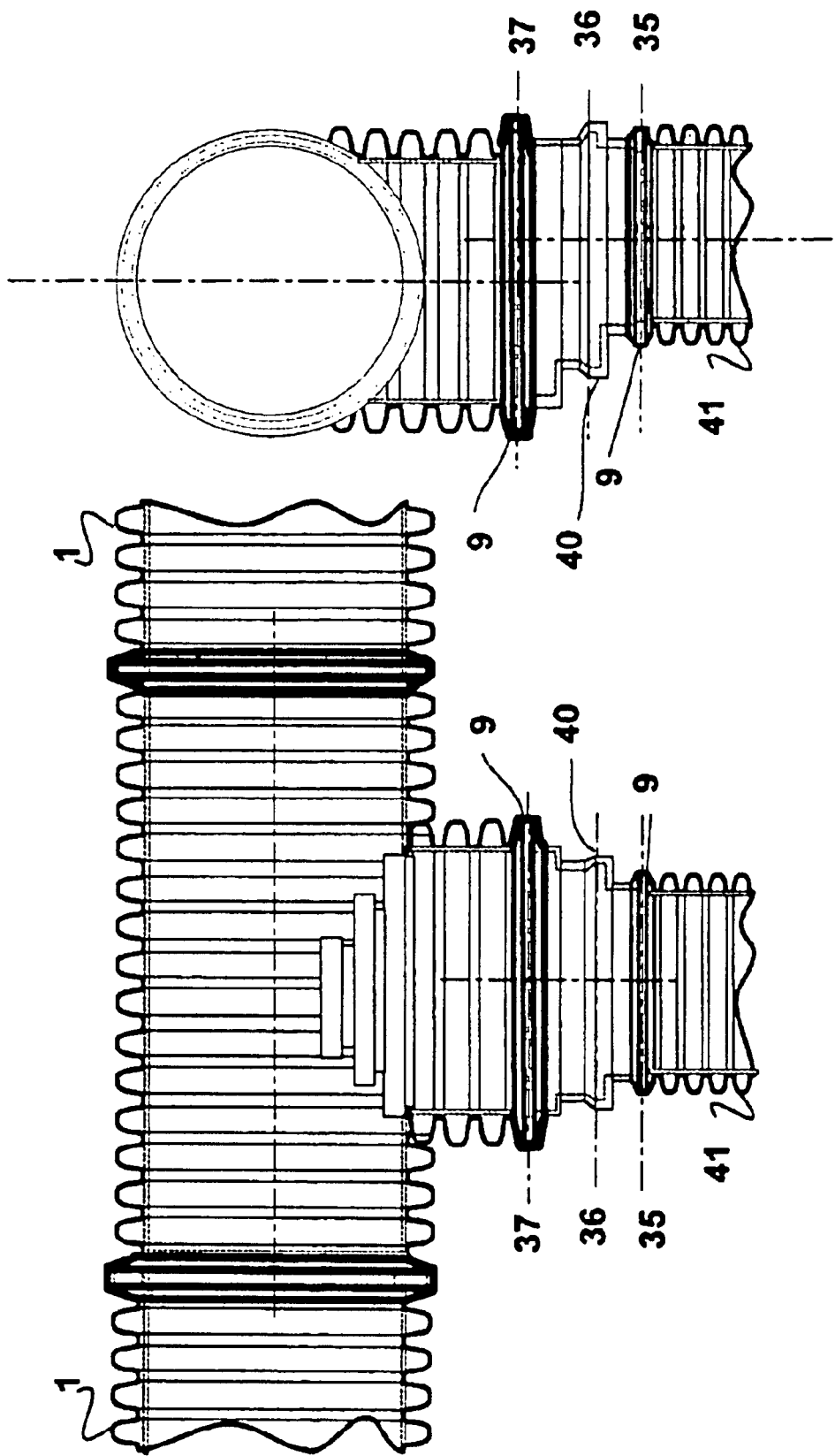

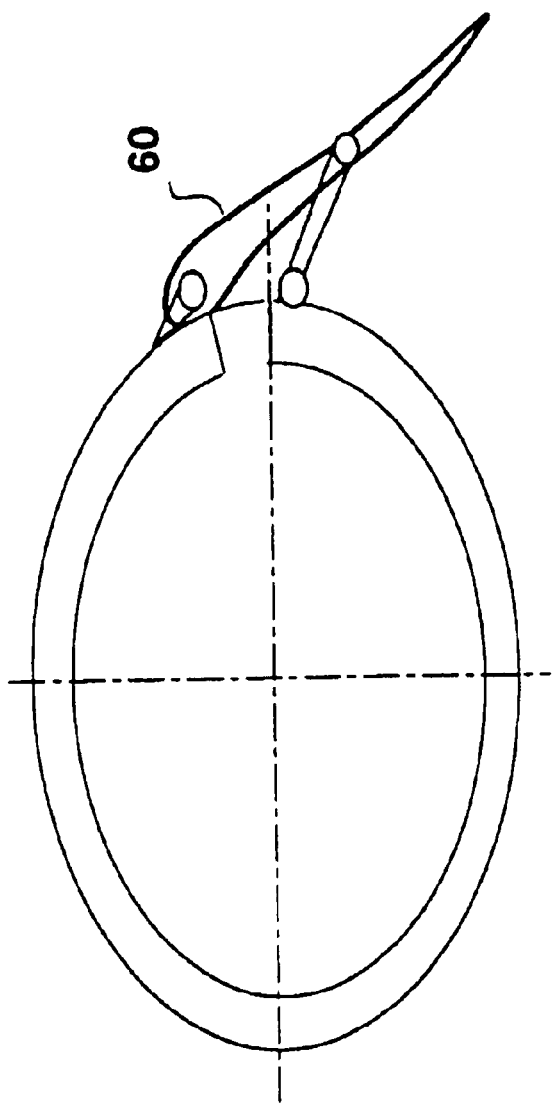
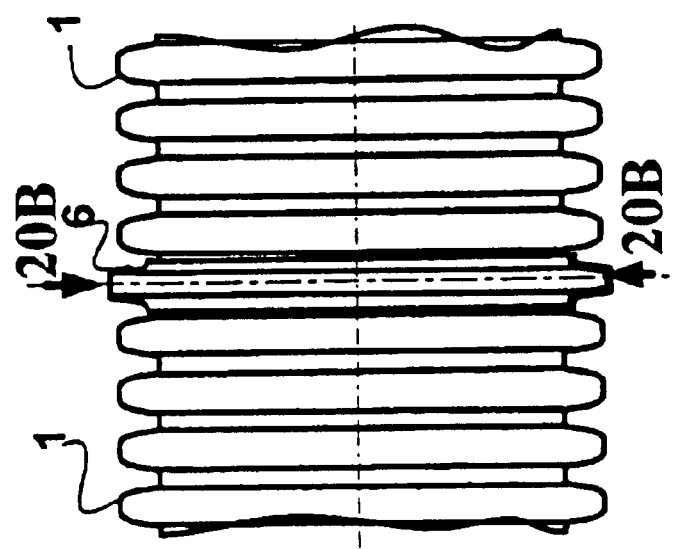
FIG. 20A
FIG. 20B

CORRUGATED PLASTIC PIPE SECTIONS HAVING FLANGED ENDS AND STRUCTURALLY TIGHT JOINTS THEREOF

CROSS-REFERENCE TO RELATED APPLICATIONS

This application is a continuation of my application Ser. No. 09/893,846, filed on Jun. 28, 2001 now abandoned, which in turn is a continuation-in-part of my then applications as of Jun. 28, 2001: "Joint and Seal for Large Diameter Corrugated Plastic Pipe and Method for Joining Plastic Pipe Sections," Ser. No. 09/597,338 filed on Jun. 19, 2000; "Water tight Joint and Method of Sealing Drainage and Sanitary Sewer Pipe Sections," Ser. No. 09/788,913 filed on Feb. 19, 2001; and "Method and Joint Design for Infield Water Tight Sealing of Dual Wall Corrugated Plastic Pipe Sections," Ser. No. 09/794,638 filed on Feb. 27, 2001;" and "Method and Joint Design for In-Field Water Tight Sealing of Pipe Sections," Ser. No. 09/803,591 filed on Mar. 9, 2001, all now abandoned.

BACKGROUND OF THE INVENTION

Large diameter corrugated plastic (typically formed from polyethylene) pipe sections are known products. Past and present attempts to design water tight joints for corrugated plastic pipe to expand the use of the pipe to drainage and sanitary sewer applications typically involve radial compression of a gasket (molded or extruded and spliced) that occurs when an end section of the pipe formed as a spigot is inserted into a corresponding end section of a pipe formed into a bell. Pushing a spigot, with a gasket wrapped around its exterior cylindrical surface, into a bell having a tapered internal surface and interference fit, typically provides the radial compression of the gasket. The motion of pushing the gasket on the spigot in an axial direction and the frictional force on the interior lateral surface of the bell may cause the gasket to un-seat, twist and roll. In addition, circumferential tensile stresses on the interior of the bell, required to maintain gasket compression, decrease the stress crack resistance of the plastic pipe. A gasket is typically located in either a groove on the crest or crown or in the root of a corrugation near the pipe end of the pipe section. In the prior case the stiffness of the corrugation is not sufficient to withstand the hydrostatic water pressure required to prevent water leaks. As a result the corrugations supporting the groove that locates the gasket are sometimes made stronger by injecting rigid foam inside the corrugation. The latter case requires banding or other strengthening to avoid the large stresses that cause stress cracking. Both solutions add considerable cost obtain a reliable water tight joint.

A further disadvantage of joints that utilize radial compressed gaskets is that the joints are subject to failure, leaking water under pressure, as a result of rolling and twisting of the gasket or by stress cracking of the bell. William C. Andrick in U.S. Pat. No. 5,687,976 describes a symmetrical gasket for pipe joints that seals against both internal lateral surface of a bell and external lateral surface of a pipe having transverse corrugations. James B. Goddard in U.S. Pat. No. 5,765,880 discloses a bell and spigot joint for helical double wall corrugated pipe. Kenichi Hattori in U.S. Pat. No. 4,871,198 discloses a clamp type corrugated plastic pipe coupling in which a rubber gasket is utilized in radial compression to seal the joint. In the latter case, the metal clamp reduces the stress-cracking problem. However, the gasket transfers stress to the plastic inner wall or liner and to the corrugations. Both the corrugations and the liner are relatively low in stiffness and have difficulty maintaining the radial compression of the gasket. The high creep behavior of semi-crystalline polymers such as high-density polyethylene is responsible for increased leaking due to aging. It may also be difficult to assemble a joint as described by Hattori when the pipe sections to be joined are located in an open trench. Another disadvantage is the relatively high cost associated with an extended cylindrical gasket and a metal clamp. Bell and spigot type joints have an additional disadvantage insofar as field cuts of sections of corrugated pipe are not possible.

My co-pending related applications for patent identified above, which are incorporated by reference as if set out in full, relate in detail the characteristics and properties of corrugated polyethylene/plastic pipe and problems encountered by the prior art in attempting to effect a water tight seal between adjacent pipe sections. In my co-pending applications for patent, I disclose, inter alia, a method and design that avoids both the rolling of the gasket and stress cracking by utilizing a portion of the end corrugation to provide a means for self-energizing a water tight seal for joining two abutting sections of pipe.

Typically, soil tight performance in corrugated plastic drainage pipe is obtained by a compressing a gasket having a relatively small cross section when compared to the height and longitudinal width of a transverse corrugation. A transverse ridge at the crown of the end corrugation (referred to as a spigot) typically supports a joint gasket. The locating seat (transverse ridge) on the end corrugation has a disadvantage in that formation of the spigot requires a thermoforming mold to be introduced in the corrugation process and the other end of the corrugated plastic pipe either requires a molded bell at the end or necessitates the use of a dual bell coupler. This approach suffers from the weakness of the walls the corrugation supporting the crown of the corrugation and the gasket plus the cost associated with manufacturing in-line bell and spigot couplers. The present invention has the advantages of eliminating the requirement to introduce a bell and spigot mold pair that avoids the cost of the bell and spigot mold and of increasing the production rate of the pipe by removing the need to reduce production rates while forming of the bell and spigot.

BRIEF SUMMARY OF THE INVENTION

The invention comprises corrugated plastic pipe sections having a flanged end formed by a circumferential portion of an end corrugation or the pipe liner and a method and kit for joining corrugated plastic pipe sections to create a structurally sound joint that may be adapted for applications where soil and water tight joint properties are required. In the system of the invention, a portion of the end corrugation or pipe liner forms a flange at the end of each pipe to be joined; a clamp straddles the outside lateral surfaces of the two flanges and draws the flanges together. A joint is thereby formed. An annular elastomeric gasket may be inserted contacting the facing surfaces of the pipe flange and a second flange at the end of another pipe or fitting, or the radially peripheral side edges of the flanges. The invention achieves a cost effective structurally sound joint, allows field cuts of the corrugated plastic pipe and the fabrication of pipe fittings and connectors from corrugated pipe sections with limited modification to the molding process.

An object of the invention is to provide a tight joint by providing a flange at the end of the corrugated plastic pipe from a circumferential portion of the end corrugation, thereby avoiding the need and expense associated with molding separate bell and spigot or dual bell couplers. It is a further object of the invention to provide a section of corrugated plastic pipe having a flange at its end formed from a section of a corrugation, the liner and/or from both the liner and the corrugation. It is also an object of this invention to provide a section of corrugated plastic pipe joined to an abutting section of corrugated plastic pipe or a fitting having a flange at its end by inserting a gasket between the abutting flanges and utilizing a clamp to axially compress a gasket to form a water tight seal. An external rigid clamp supports the relatively weak flange eliminating the need to stiffen the end of the corrugated pipe by injecting rigid foam into the end corrugations.

The present application also discloses a kit for providing a water tight seal between adjacent (abutting) sections of corrugated plastic pipe or fittings comprising a gasket and a flange clamp adapted to form the joint. In a further object, the invention comprises a design for and method of using fabricated fittings to join flanges on the end sections of corrugated pipe that are formed from circumferential portions of the pipe corrugations and/or liner. Presently fabricated fittings typically require pipe ends that have bell shapes or spigot shapes and may require dual bell couplers. The present invention eliminates the need for specially formed ends and couplings and allows corrugated pipe to be manufactured without introducing coupling molds into the forming process, thus saving the money associated with utilizing specially molded bells and spigots for fittings. The invention eliminates the need for bell and spigot ends on sections of corrugated plastic pipe and fittings and eliminates the need for internal and external dual bell couplers.

Presently stepped reducing "Y", "T" and four way fittings are fabricated for single wall corrugated pipe. This has been accomplished by roto-molding and by blow molding fittings with several diameter bells in series. This practice allows the pipe manufacturer to supply a universal fitting that is adapted in the field by the installing contractor, who simply cuts off the fitting at the bell diameter of his choice. It is a further object of this invention to disclose stepped fittings for dual wall corrugated plastic pipe that utilize flanges of varying diameters. This invention discloses a molded, stepped, selectable diameter, and offset reducer coupling that provides a means of forming a water tight joint with corrugated plastic pipe and plastic and none plastic pipe sections having different diameters and flange ends. Furthermore it is the object of this invention to disclose a molded fitting design with an integral stepped, selectable diameter, and offset reducer coupling for joining corrugated plastic pipe having flange ends and the same and different diameters in a water tight fashion.

The enhanced joint design and method of fabricating soil tight and water tight joints disclosed is cost effective, allows field cuts of corrugated plastic pipe, and simplifies in-plant fabrication of flanged end fittings from sections of corrugated pipe. A clamp is utilized to compress the annular gasket by drawing the two flanges together. This invention utilizes a portion of the end corrugation or liner to provide an interior surface to compress a rubber gasket and an exterior surface against which the clamp radially pushes inwardly.

The invention is described more fully in the following description of the preferred embodiment considered in view of the drawings in which:

BRIEF DESCRIPTION OF THE SEVERAL VIEWS OF THE DRAWINGS

FIG. 7A shows the front view of a flat gasket utilized between flanges and FIG. 7B shows the side view of the gasket.

FIG. 7C shows the front view of a wedged gasket between flanges and FIG. 7D shows the side view of the gasket.

FIG. 7E and FIG. 7F respectively show the front and side views of an "O" ring gasket between flanges.

FIG. 7G and FIG. 7H respectively show the front and side views of an external inverted "V" gasket.

FIG. 8A and FIG. 8B respectively show the front and side views of a typical single element "V retainer circular" flange clamp utilized to draw the flanges together and compress the gasket.

FIG. 8C and FIG. 8D respectively show the front and side views of a typical three-segment "V retainer" circular flange clamp utilized to draw the flanges together and compress the gasket.

FIG. 8E and FIG. 8F respectively show the front and side views of a typical three-segment "inverted wedge" circular flange clamp utilized to draw the flanges together and compress the gasket.

FIG. 8G and FIG. 8H respectively show front and side views of a joint utilizing a lever or toggle clamp.

FIGS. 8I and 8J respectively show top and front views of a circular flange clamp having a ratchet mechanism for locking in the tightened configuration and tool for tightening the circular flange clamp.

FIG. 9A and FIG. 9B respectively show the front and side views of a circular flange clamp having two spilt plates.

FIGS. 16D and 16E respectively show the front and end views of an assembly of a fabricated "T" fitting joining two in-line pipe sections of dual wall corrugated plastic pipe to smaller diameter dual wall corrugated plastic pipe by means of a molded stepped reducer.

FIG. 20A is a side view of a joint applied to a non-circular, oblong, oval elliptical or other curvilinear perimeter pipe.

FIG. 20B is a radial cross section of the joint of FIG. 20A also showing a single sectioned toggle clamp.

DETAILED DESCRIPTION OF THE INVENTION

Figure 1:
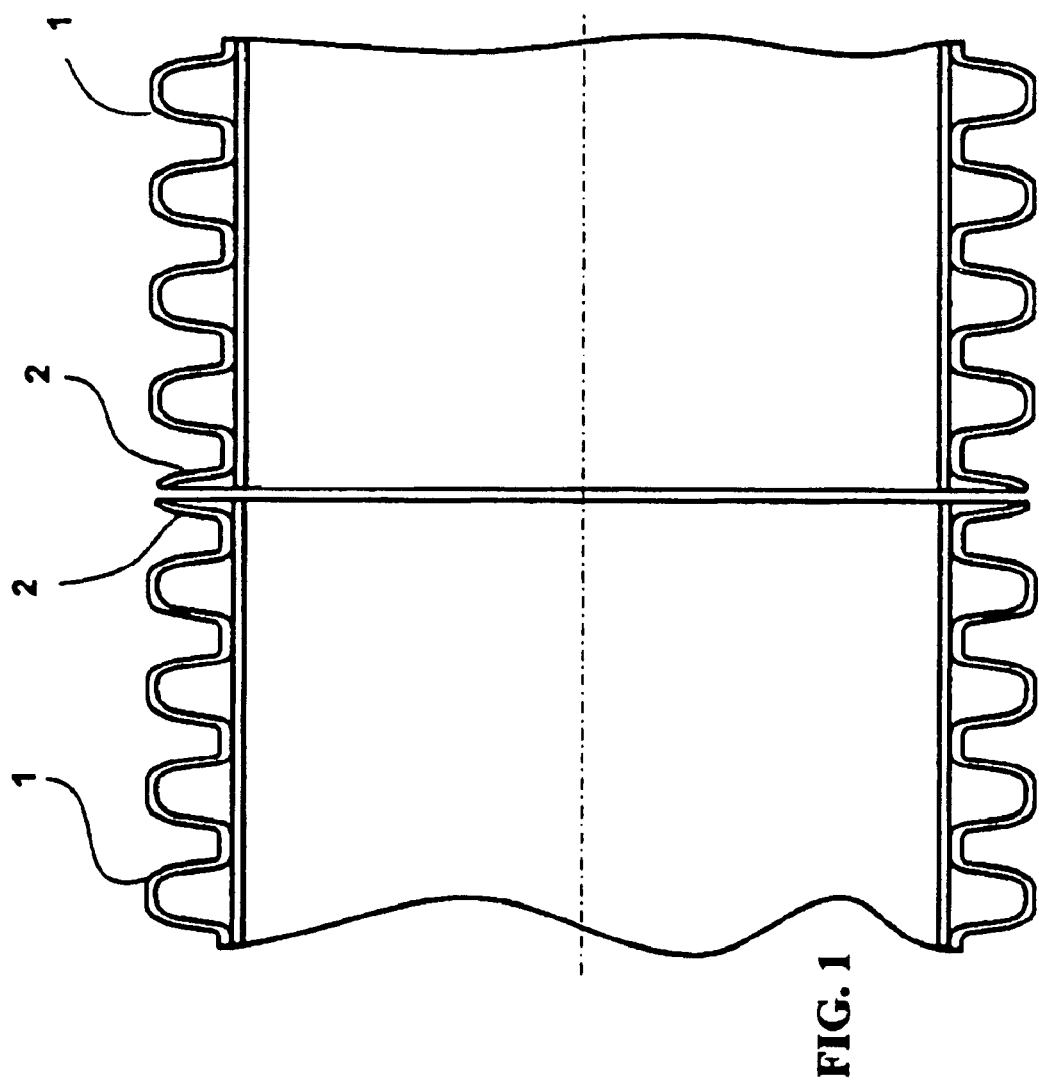
FIG. 1 is a cross section of two sections of dual wall corrugated plastic pipe having flanges at their ends formed from a section of the circumferential portion of an end corrugation.

The invention facilitates the field installation of structural, soil tight and water tight joints between sections of corrugated plastic pipe utilized for drainage and sanitary sewer applications. The invention provides a section of corrugated plastic pipe having a flange at its end formed from the circumferential portion of a corrugation segment and/or the pipe liner. In its different aspects and embodiments, the invention comprises a section of a plastic pipe, or fittings for plastic pipe, having transverse corrugations and an end flange maintained in a joint relationship by a peripheral clamp.

The invention produces joints between pipes and a pipe and fitting have tightness properties ranging from a structurally sound, tight joint effected by the use of a clamp only (without a gasket) with regard to a flanged end, ranging to soil tight, water tight and gas tight joints depending on flange, gasket and clamp design parameters to adapt the joint system for a predetermined use or environment. A circumferential portion of a corrugation or a circumferential portion of the liner extending from the corrugated pipe section forms the flange. In an assembly, two abutting sections of corrugated plastic pipe having flanges on their ends are joined together in an assembly in which a peripheral flange clamp engages the flanged ends forming a structural joint.

A gasket may be interposed between the flanges. The gasket may have a flat annular shape, a wedge shaped cross section, or an "O" ring shaped cross section and may include other shapes such as ridges and the like on the surface thereon. In the invention, a section of corrugated plastic pipe having a flange may be joined to any section of a complementary pipe or fitting having a flange. The circular flange clamp may be a "V" (or "U" shape) groove or channel single segment retaining coupling or a similarly shaped open retainer coupling having a multiplicity of sections circumferentially disposed to join the abutting flange end sections of the adjacent pipe sections.

The invention also comprises a method of forming a flange at the end of a pipe section or fitting having transverse corrugations in which the flange is formed from a circumferential portion of the end corrugation and/or the liner of the pipe at the end of the pipe section or fitting.

In providing a soil tight and/or water tight seal between pipe sections, the invention comprises a method of joining abutting sections of flanged pipe by providing a section of corrugated plastic pipe and a rigid plastic or metal pipe or fitting having a flange at its end, inserting a gasket between or around the two flanges, and circumferentially clamping the flanges to provide pressure on the exterior surface flanges to draw them together and thereby compress the gasket. A peripheral flange clamp having a single segment or a multiplicity of segments joins the flanged ends and provides compression of the gasket when a gasket is used. The method further involves forming a flange at the end of a section of corrugated plastic pipe by transversely severing a section of the corrugated pipe at an axial location of a pipe end corrugation.

The invention is also a kit for providing a water tight seal between adjacent sections of corrugated plastic pipe or a section of corrugated plastic pipe and a pipe or fitting having a flanged end. The kit comprises a gasket and a circular flange clamp having an initial opening sufficient to receive therein the adjacent flanges of the pipe sections to be joined; the clamp compresses the gasket between the flanges. For the on site fabrication of joints between corrugated pipe sections and another flanged component, the kit of the invention includes a portable router or saw and guide fixture assembly for making field cuts in a section of corrugated pipe and/or fabricated fittings. The router or saw provides a flange at the pipe or fitting end by cutting away a circumferential portion of a pipe corrugation or liner to form the flange from the remaining section of the corrugation.

Figure 2:
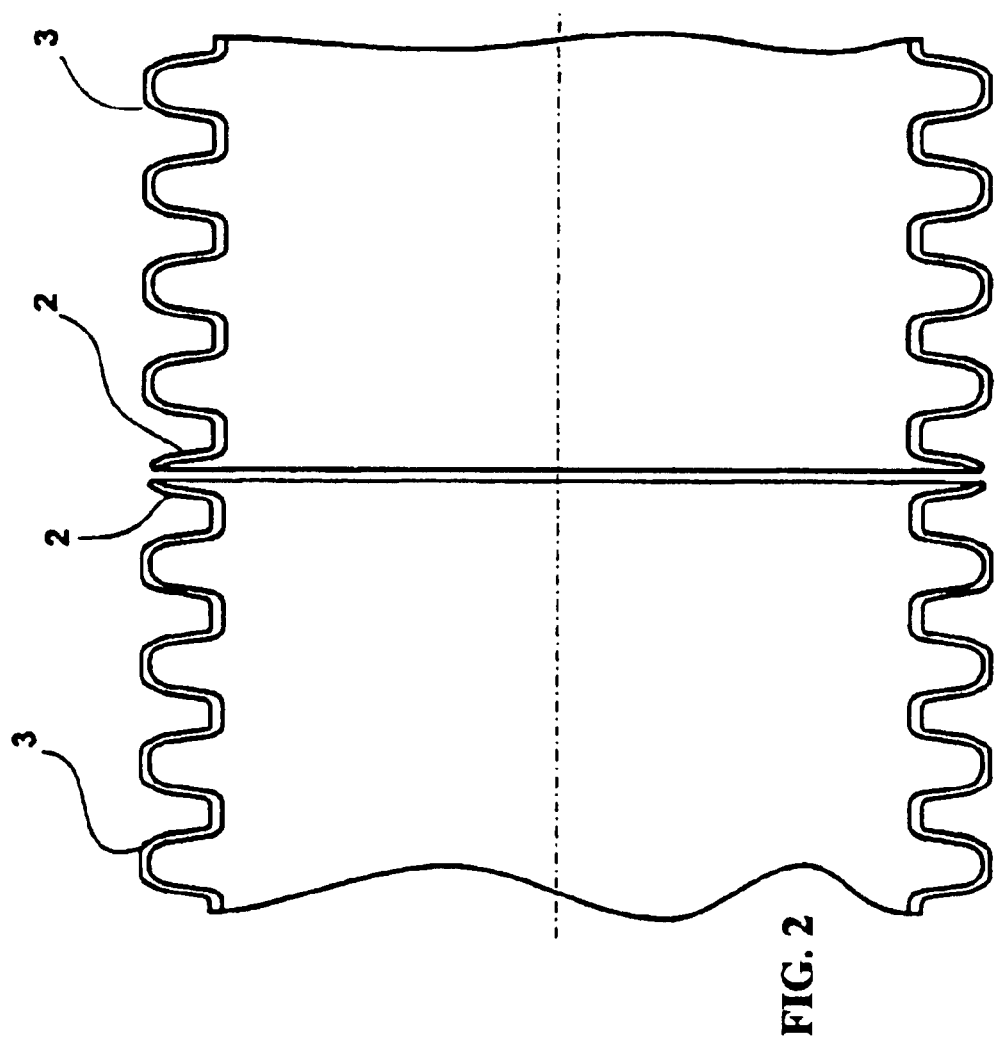
FIG. 2 is a cross section of two sections of single wall corrugated plastic pipe having flanges at their ends formed from the circumferential portion of an end corrugation segment.
Figure 3:
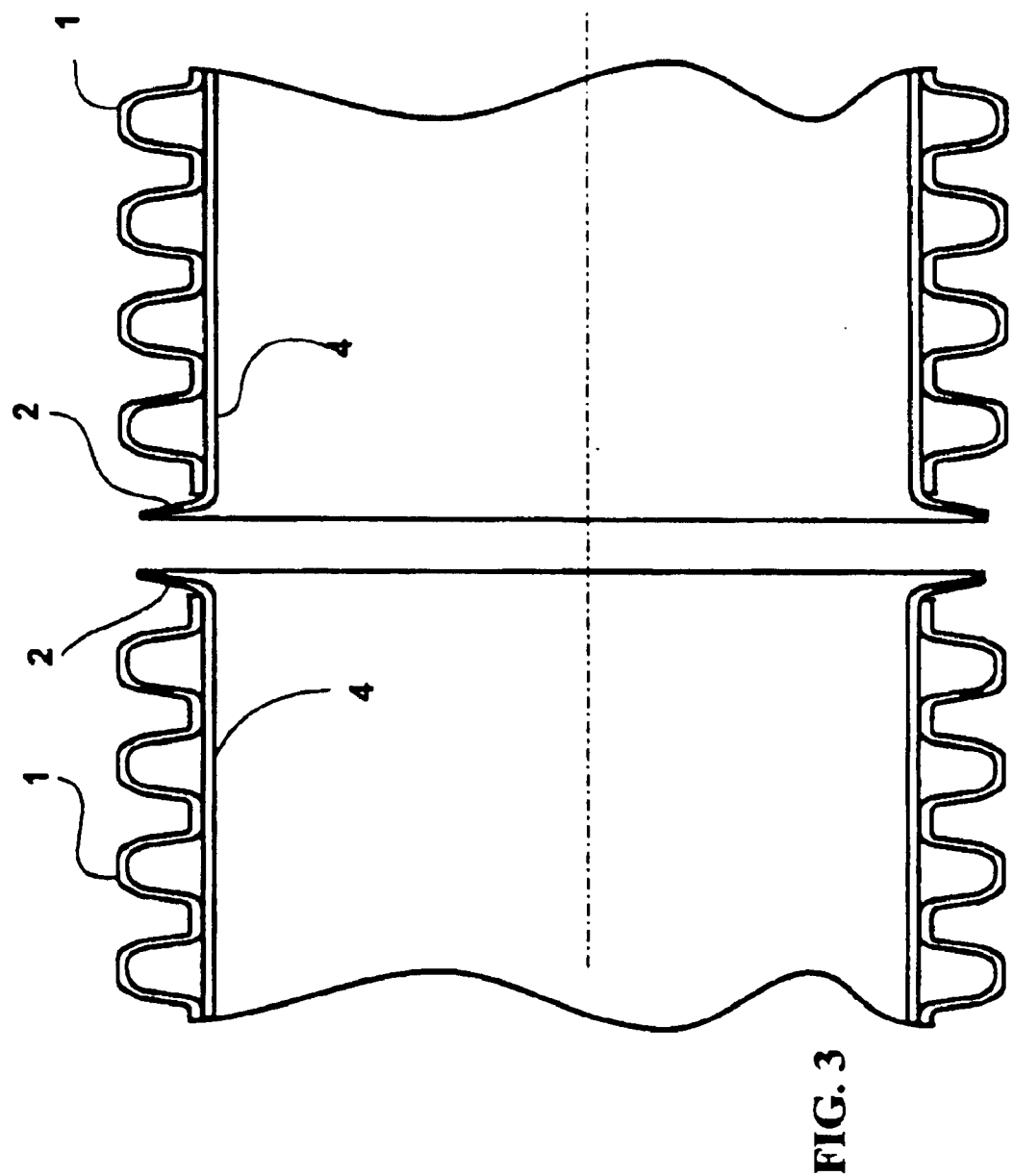
FIG. 3 is a cross section of two sections of dual wall corrugated plastic pipe having flanges at their ends formed from a circumferential portion of the inner wall or liner extending from the end.
Figure 4:
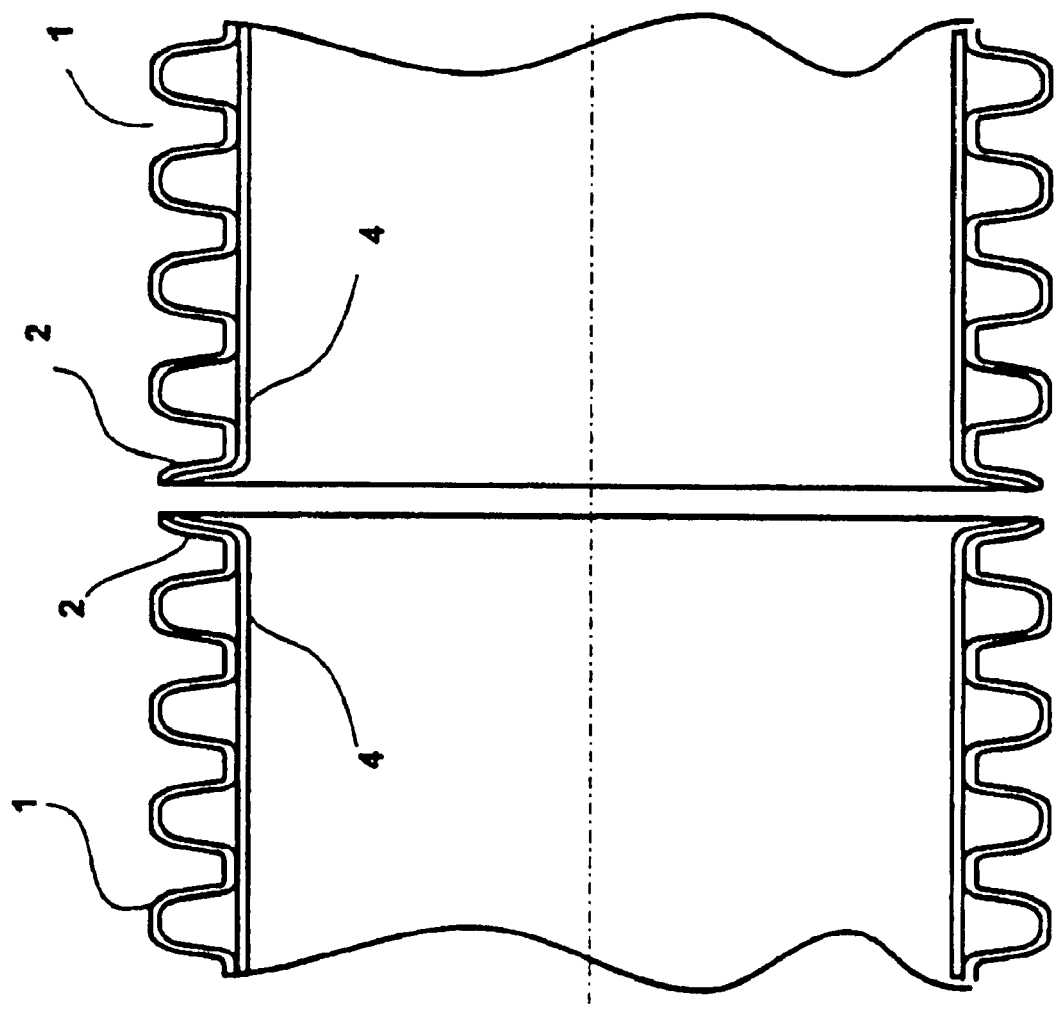
FIG. 4 is a cross section of two sections of dual wall corrugated plastic pipe having flanges at their ends formed from a circumferential portion of the inner wall or liner and a section of (namely, a partial segment of material) what would otherwise form an end corrugation.

FIG. 1 shows the preferred embodiment for two sections of dual wall corrugated plastic pipe 1 each having a flange 2 at its end formed from a circumferential portion of a corrugation. FIG. 2 shows the preferred embodiment for a single wall corrugated plastic pipe 3 at its end having a flange 2 formed from a circumferential portion of a corrugation. FIG. 3 shows another embodiment for sections of dual wall corrugated plastic pipe 1 having a flange 2 at its end formed from a circumferential portion of the liner 4. FIG. 4 shows a dual wall corrugated plastic pipe 1 having a flange 2 at its end formed from a circumferential portion of the liner 4 and a portion of a corrugation.

In the invention, a corrugated pipe with a design having a flange formed from a circumferential segment of the end corrugation, from the liner at the end of the pipe or from a circumferential segment of an end corrugation and the liner is provided. The method of fabricating flanged ends on plastic pipe with transverse corrugations can be accomplished in the factory and in the field by cutting the pipe at a corrugation so that a flange shaped portion of the end corrugation remains. In the field, the contractor can cut the corrugated pipe and form the flange simultaneously by using a portable router or other cutting devices such as a circular saw having a fixture that guides the cutter around the circumference of the pipe at the desired axial position. While the application herein refers to the pipe and joint elements as "circular," it is noted that the large diameter pipes with which the invention is intended to be used may have other cross sections, such as elliptical, oval and the like and it is intended to include such cross sections as well within the scope of the term "circular." FIGS. 20A and 20B illustrate such pipes and joints.

Figure 5A:
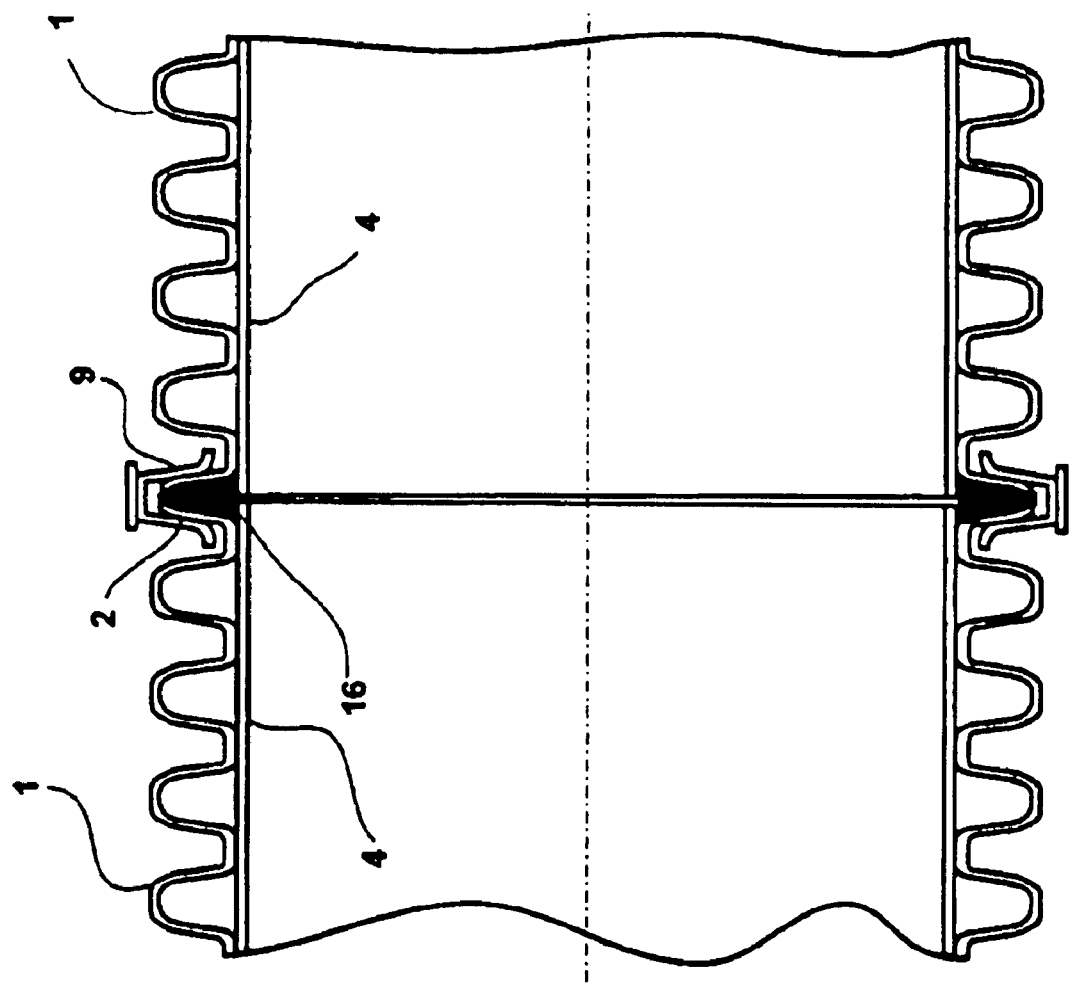
FIG. 5A is a cross section of a joint between abutting ends of two sections of dual wall corrugated plastic pipe utilizing a wedge shaped gasket between the abutting ends and a circumferential or perimeter flange clamp.
Figure 5B:
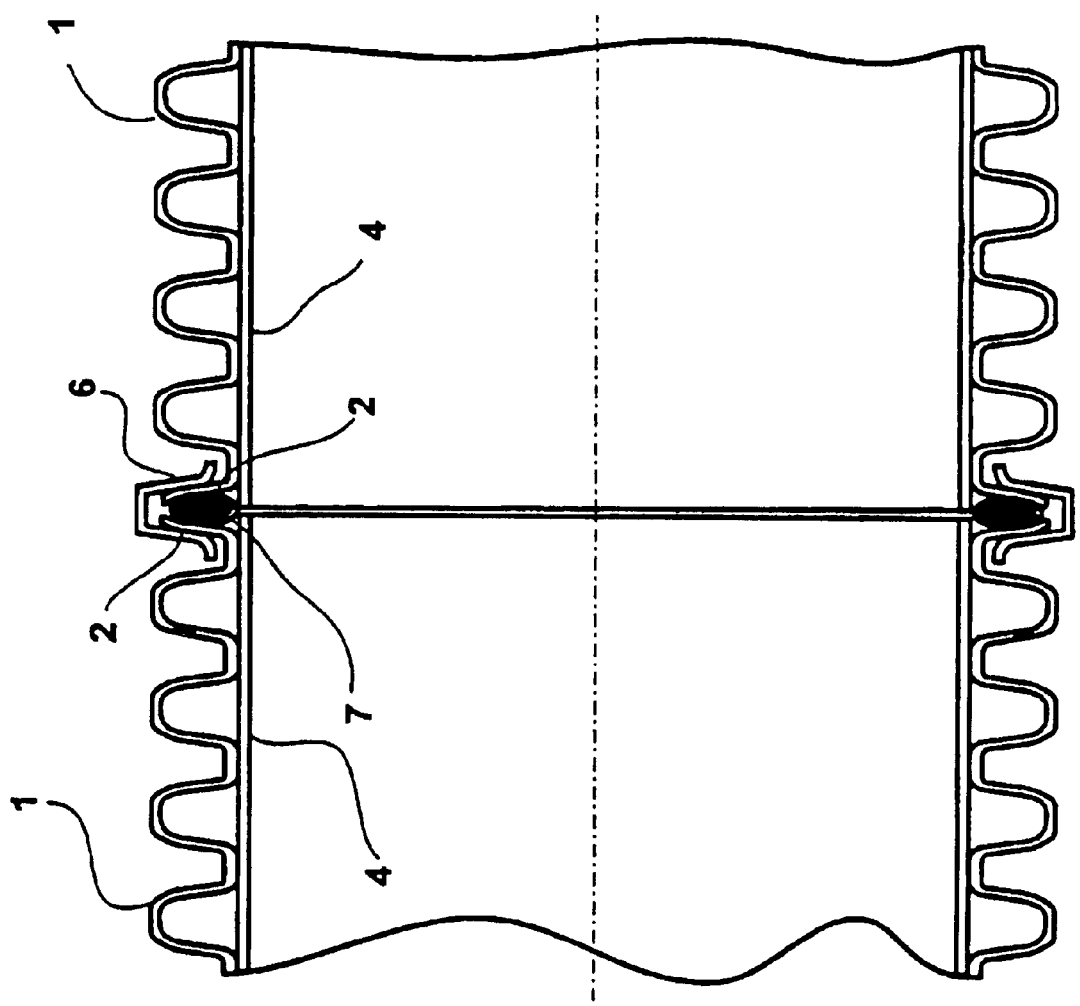
FIG. 5B is a cross section of a joint between abutting ends of two sections of dual wall corrugated plastic pipe utilizing an "O" ring gasket between the abutting ends and a flange clamp.
Figure 5C:
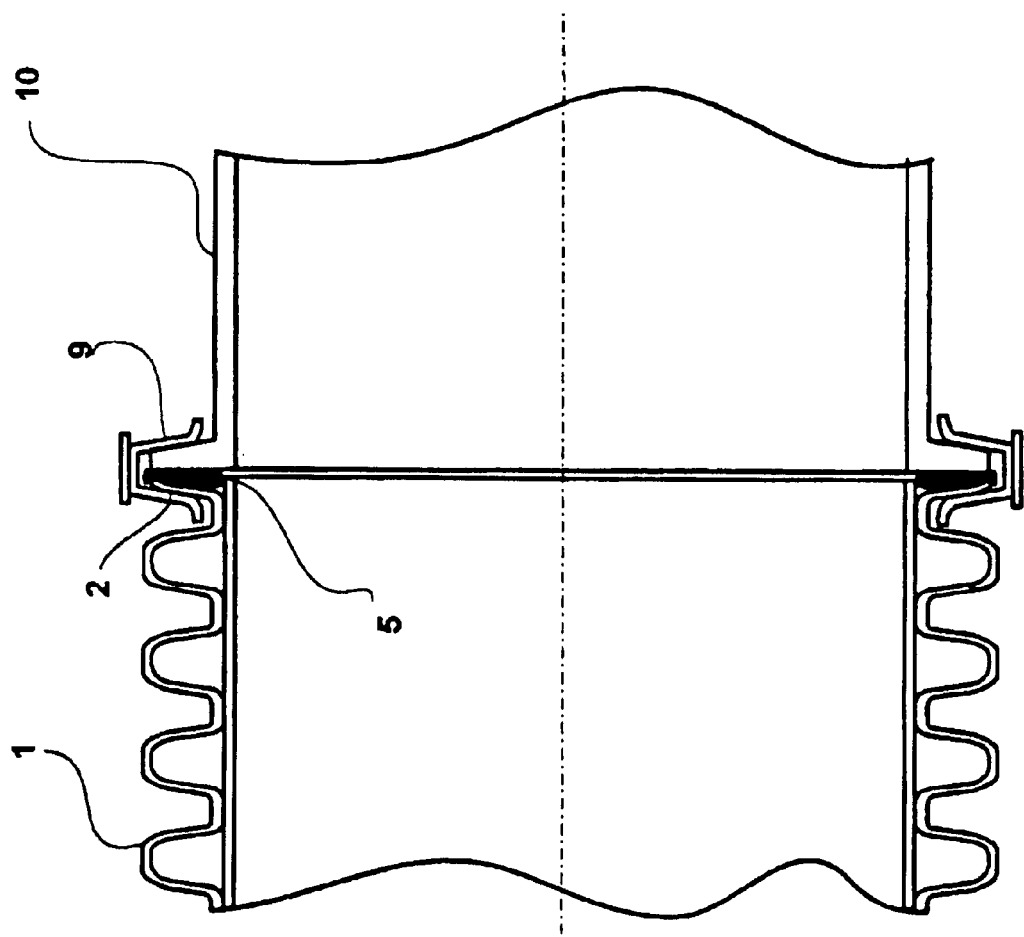
FIG. 5C is a cross section of a joint between abutting ends of a section of dual wall corrugated plastic pipe and a section of rigid pipe having a flange end utilizing a flat gasket between the abutting ends and a perimeter flange clamp.
Figure 5D:
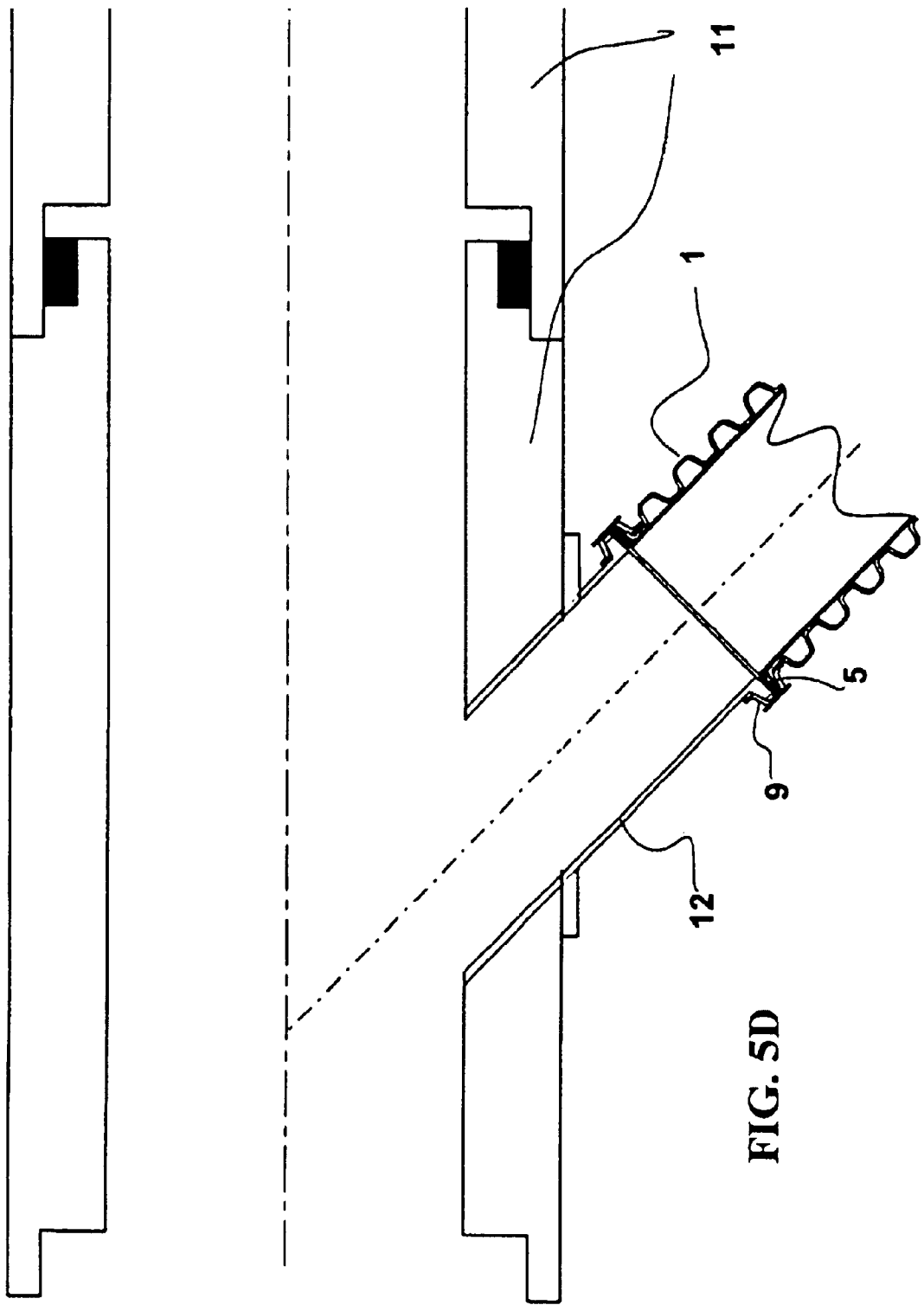
FIG. 5D is a cross section of a concrete pipe with a mortared metal flange joined to a corrugated plastic pipe utilizing a gasket and a flange clamp.
Figure 5E:
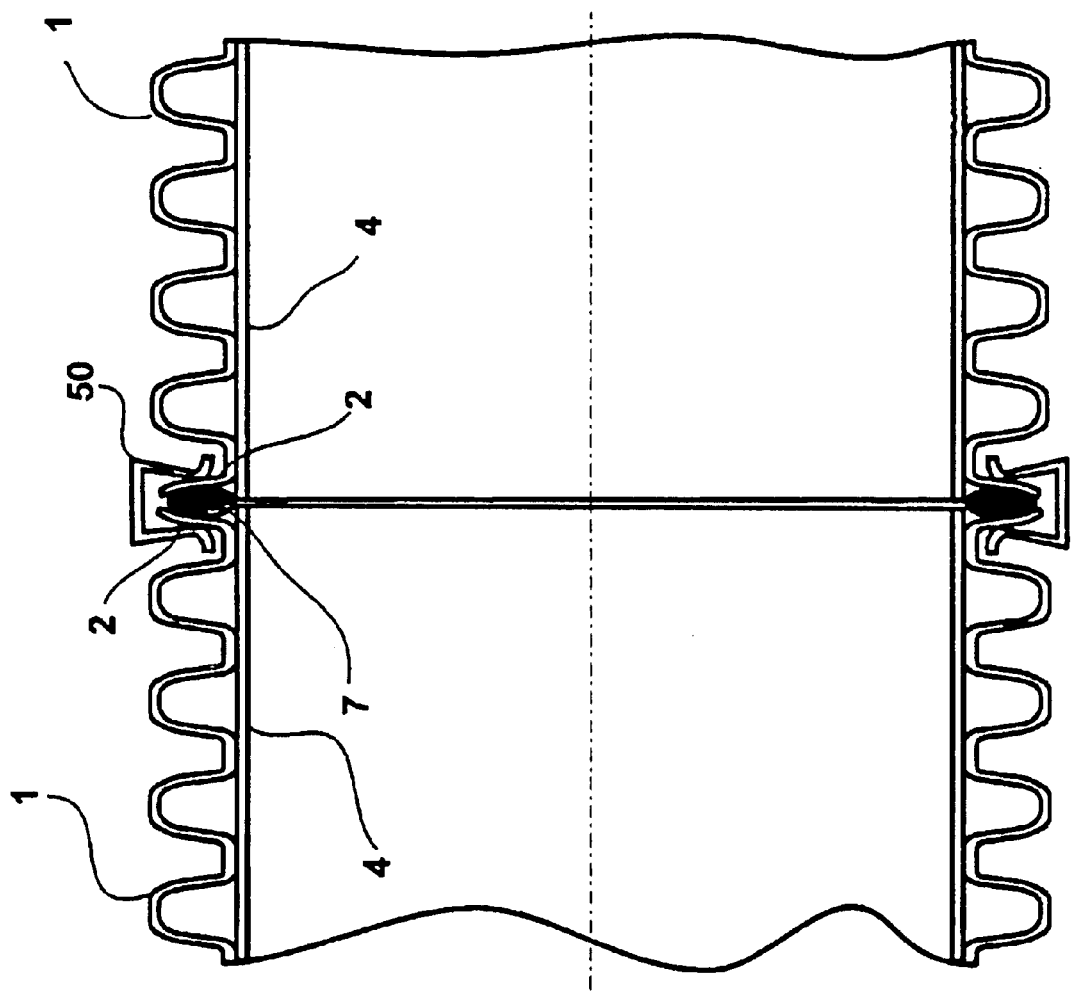
FIG. 5E is a cross section of a joint between abutting ends of two sections of dual wall corrugated plastic pipe utilizing an "O" ring gasket and an inverted wedge shaped flange clamp.
Figure 6A:
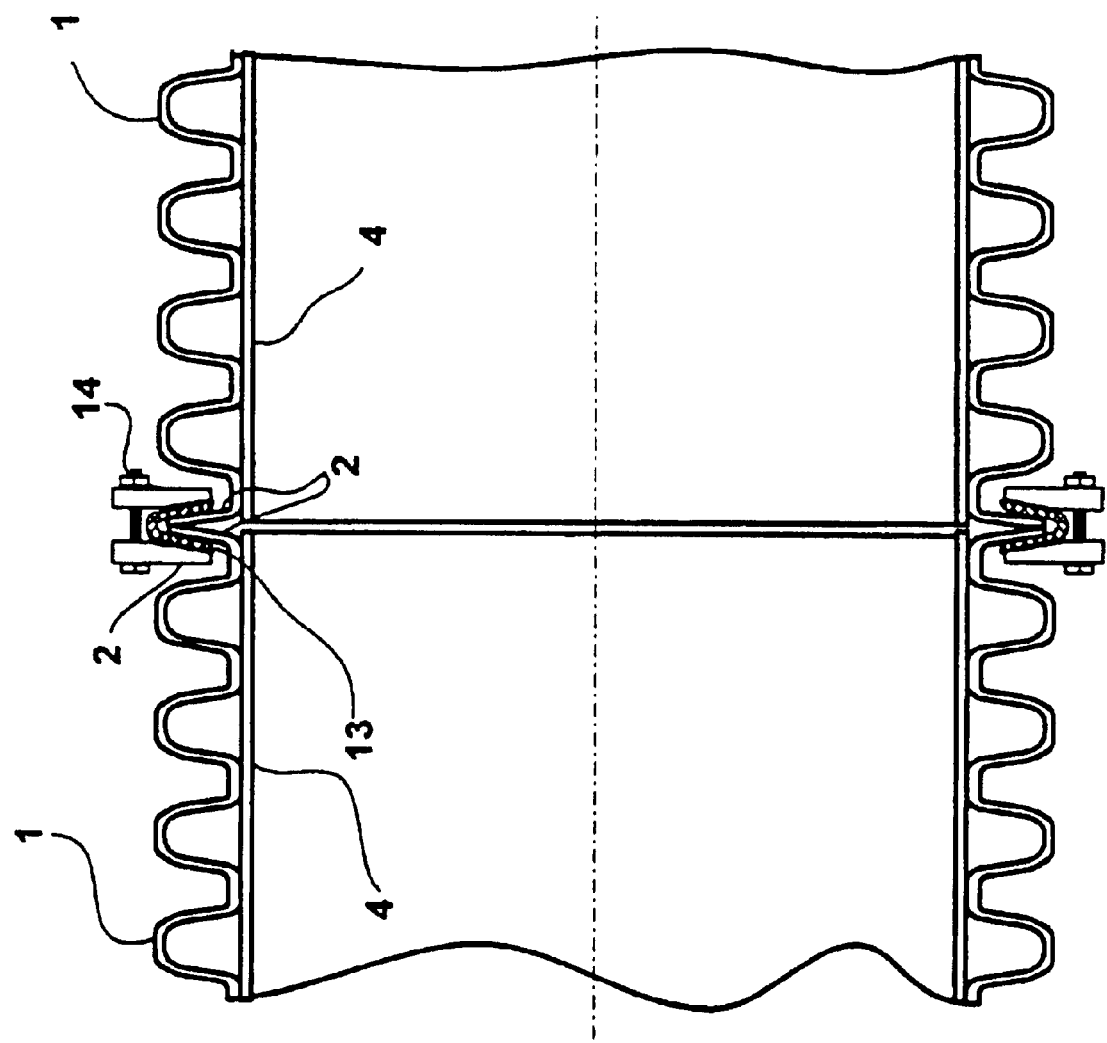
FIG. 6A shows a cross section of a joint between two sections of corrugated plastic pipe having flange ends, utilizing an external gasket that straddles the abutting flanges and a circumferential or perimeter flange clamp having split annular plates.
Figure 6B:
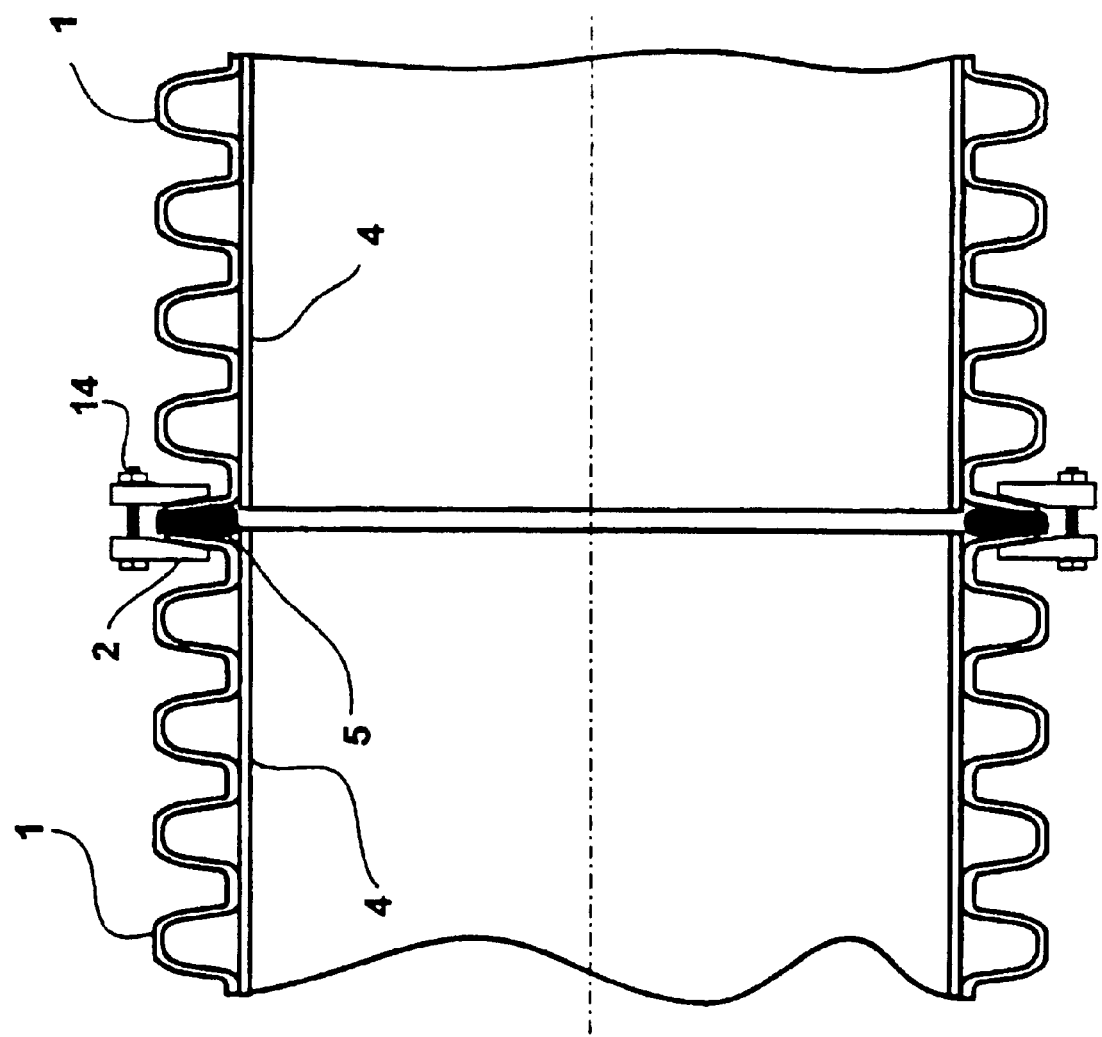
FIG. 6B shows a cross section of a joint between two sections of corrugated plastic pipe having flange ends, utilizing an internal gasket between the abutting flanges and a flange clamp having a pair of split annular plates.

The invention also provides a design and method for water tight joining of plastic pipe having transverse corrugations. FIG. 5A shows a soil tight and water tight joint design for dual wall pipe having transverse corrugations. This joint comprises a section of dual wall plastic pipe 1 having transverse corrugations and a flange 2 formed from the circumferential section of the end corrugation, a wedged shaped gasket 16 inserted between to abutting flanges and a "V" retaining circular flange clamp 69. FIG. 5B shows a soil tight and water tight joint for two abutting dual wall corrugated plastic pipe sections having flange ends 2, an "O" ring gasket 7 between the abutting flanges and a single segment "V" retaining circular flange clamp 96. FIG. 5C shows a soil tight and water tight joint between a dual wall corrugated plastic pipe having a flange end and a rigid pipe 10 end also having a flange end. This embodiment demonstrates how metal and rigid plastic pipe ends 10 can be joined with a flat gasket 5 and a multi segmented "V" retaining circular flange clamp 9. FIG. 5D exhibits an embodiment that shows how the method and design shown in FIG. 5C can be applied to join corrugated plastic pipe to concrete pipe 11 by using a metal pipe section 12 that is fixed to the concrete pipe by mortar. FIG. 5E exhibits a an embodiment that in which two abutting dual wall corrugated pipe flange ends are joined by an "inverted wedge" circular flange clamp 50 compressing an "O" ring gasket. FIG. 6A shows soil tight and water tight joining of two sections of dual wall corrugated plastic pipe 1. In this embodiment, circular flange clamp 14 has two split annular plates and an external reverse "V" gasket 13. FIG. 6B shows the soil tight and water tight joint embodiment wherein circular clamp 14 is utilized to compress the flat gasket 5. FIGS. 7A and 7B show respectively a front and side view of an annular flat gasket 5 preferably fabricated from a cross-linked elastomer or rubber. FIGS. 7C and 7D show respectively a front and side view of a wedge shaped gasket 16. Many shapes are suitable for this application; an example is the "O" ring 7 shown in FIGS. 7E and 7F. Some categories of gaskets, however, have rounded, elliptical, or other cross-sections that are intended herein to be included within the definition of "O" ring gaskets. FIGS. 7G and 7H respectfully shows a front and side view of an external gasket 13 having an inverted "V" cross-section. The external gasket straddles the outside of the flanges 2. FIGS. 8A and 8B are front and sides views that show a typical circular flange clamp 6 sometimes referred to as a "V" retaining coupling. The function of this flange clamp 6 is to draw the flanges together as the diameter of the clamp is made smaller by the action of closing a clamp or a tightening a bolt 18. The "V" shaped circular channel 17 provides a dual wall tapered clamping action that compresses the gasket between the flanges. The material of construction of the "V" retaining coupling can include a rigid plastic or metal. The preferred embodiment utilizes a stainless steel similar to 301, 303 and 304 stainless steel to minimize corrosion, however, galvanized steel or rigid plastic construction is adequate and may be more cost effective than stainless steel. 316 stainless steel is utilized for marine applications where salt water is a concern. The "V," "U," inverted wedge or other open shaped groove, slot, or receptacle of the peripheral flange clamp may be formed from a single segment or multiple segments. Multi-segmented "V" retaining couplers provide more convenient assembly by making the circular flange clamp 9 more flexible. Preferably, the perimeter clamp should have sufficient hoop flexibility to accommodate the change in shape or roundness caused by back filling. The clamp should allow a resiliency comparable to that of the pipe to accommodate expansion and contraction, and compression of the pipe when it is buried. FIGS. 8C and 8D respectively show a front and side view of a "V" retaining circular flange clamp 9 with three segments. The tri-segmented circular flange clamp 9 is preferred to single, dual and quad segmented clamps; however, all are satisfactory. FIGS. 8E and 8F respectively show a front and side view of a tri-segmented, "inverted wedge" shaped circular flange clamp. FIGS. 9A and 9B respectively show front and side views of an alternate circular flange clamp 14 having two split annular plates that are brought axially together to compress the gasket.

There have been many attempts to utilize larger circular flange type clamps to draw the full end corrugations together and simultaneous compress a gasket. These attempts fail because of the flexibility of the corrugations. The corrugations readily deform under pressure and move out of the way when water pressure is applied. Efforts are being made to stiffen the corrugations by injecting them with rigid foam to improve the joint properties. The structural advantage of the present invention is that the circular flange clamp does not rely on the stiffness of the plastic. Instead the plastic is subjected to compression by the circular flange clamp and transfers this stress into the gasket. The stress-cracking behavior of the pipe is not significantly affected because there are little or no tensile stresses applied to the plastic flange.

EXAMPLE I

An example of the preferred embodiment is the forming of water tight joints with High Density Polyethylene (HDPE) pipe utilized for drainage and sanitary sewer applications. The circular flange clamp is a "V" retaining coupling fabricated from 301 Stainless Steel and the gasket is extruded and spliced from natural rubber, polyisobutylene or neoprene rubber. In this example, the corrugated HDPE pipe has corrugations that are too flexible to maintain the gasket compression required for water tight sealing. As a result, typically, the corrugations are filled with rigid foam to provide sufficient stiffness. The process of foaming the corrugations is time consuming and relatively expensive. The present invention eliminates stiffening requirements because the rigid clamp provides the stiffness. In this preferred embodiment the wedged shaped gasket may be a cured natural rubber or polyisobutylene having a durometer or hardness on the Shore A scale between 50 and 60. However, a variety of elastomeric gaskets having similar properties will also function well.

Figure 10A:
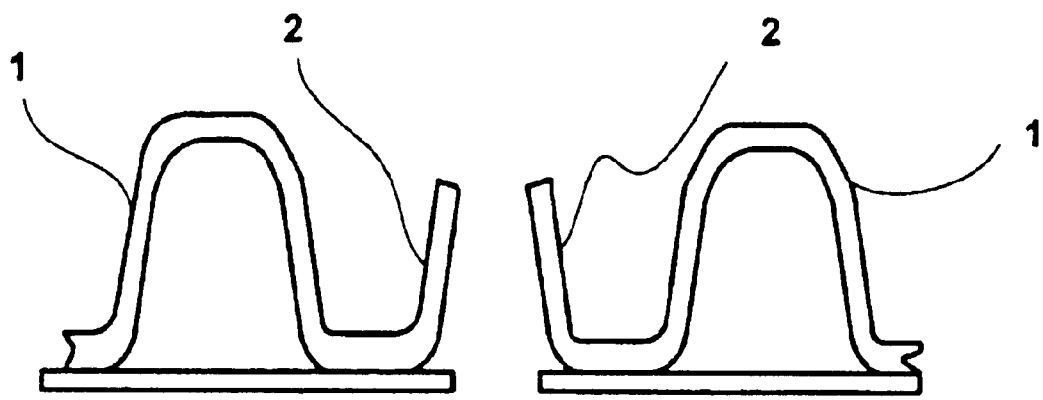
FIG. 10A is cross sectional view of adjacent ends of dual wall corrugated plastic pipe sections having end flanges formed from circumferential portions of end corrugations.
Figure 10B:
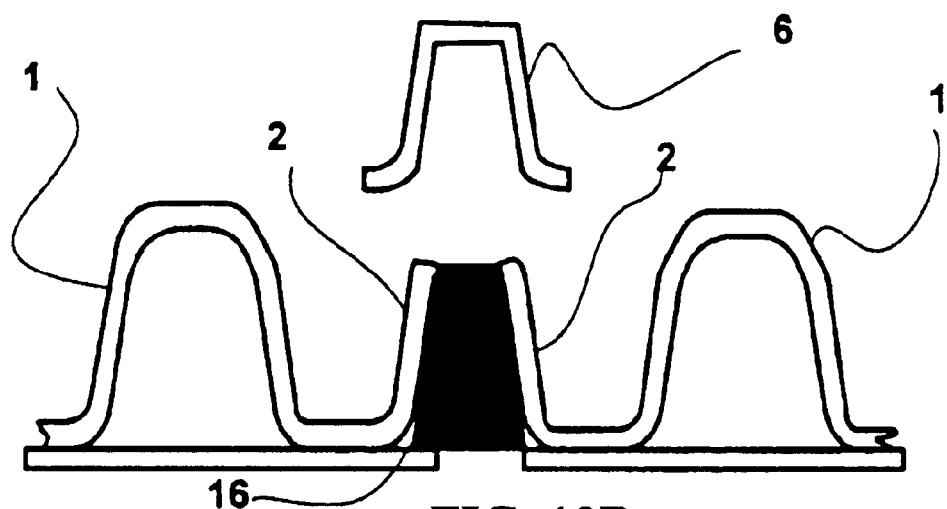
FIG. 10B is a cross sectional view of two end sections of dual wall corrugated plastic pipe, a wedged shaped gasket and a circular flange clamp before final assembly.
Figure 10C:
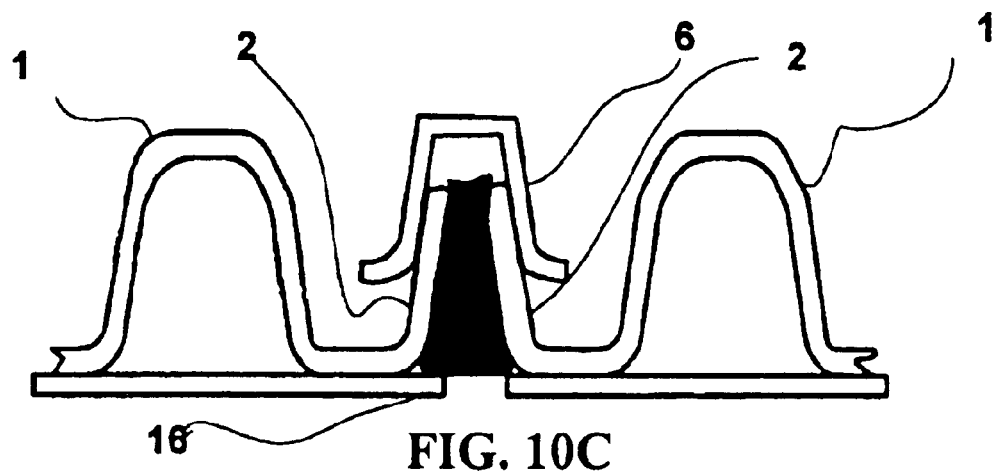
FIG. 10C is a cross sectional view of a section of an assembled soil tight and water tight joint composed of two flange ends of dual wall corrugated plastic pipe, a wedged shaped gasket and circular flange clamp.
Figure 10D:
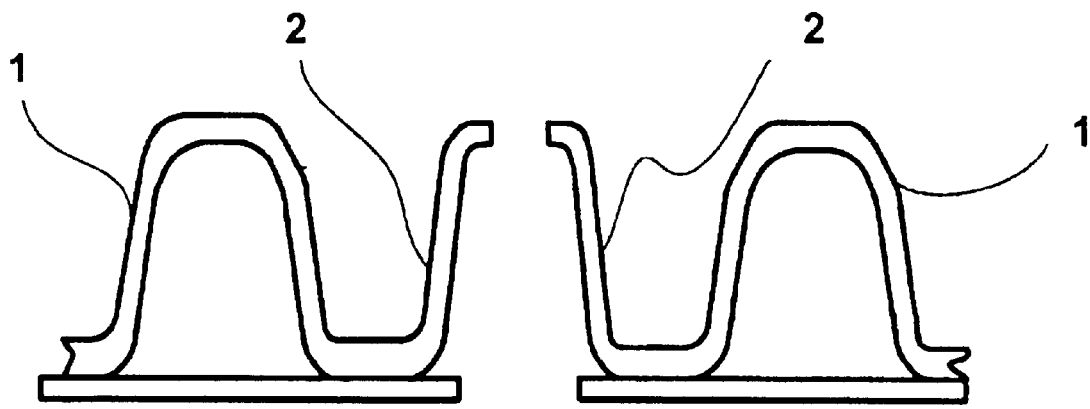
FIG. 10D is a cross sectional view of adjacent ends of dual wall corrugated plastic pipe sections having flanges formed from circumferential portions of end corrugations showing the preferred embodiment.
Figure 10E:
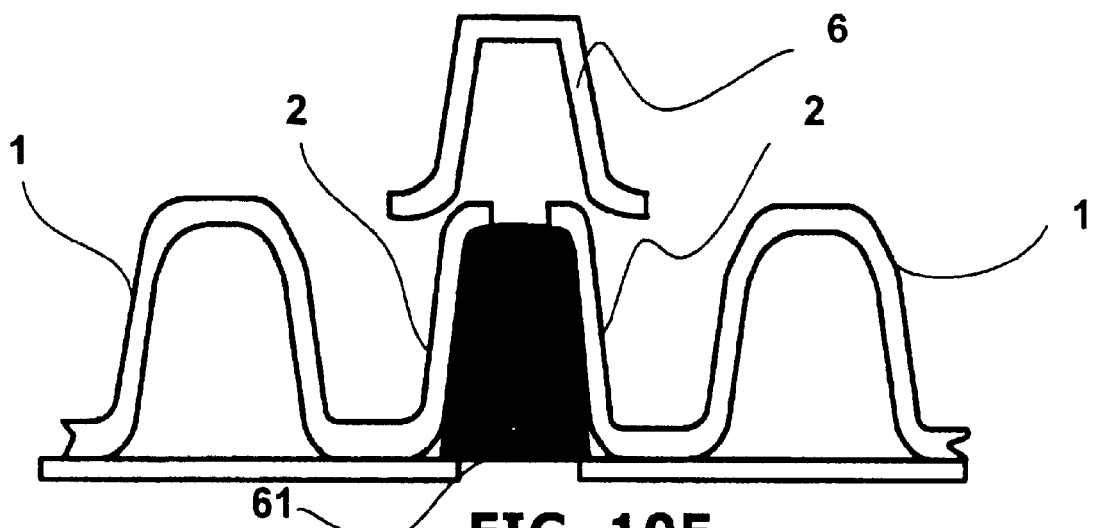
FIG. 10E is a cross-sectional view of two end sections of dual wall corrugated plastic pipe, a wedged shaped gasket formed to match the internal surface of the end corrugations and a circular flange clamp before final assembly showing the preferred embodiment.
Figure 10F:
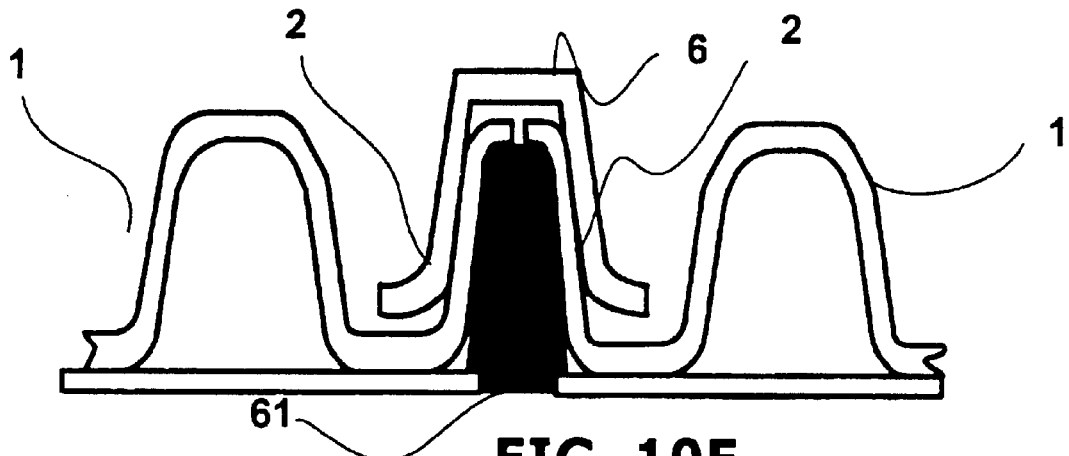
FIG. 10F is a cross sectional view of a section of an assembled soil tight and water tight joint composed of two flanged ends of dual corrugated plastic pipe, a wedge shaped gasket formed to match the internal surface of the end corrugations and circular flange clamp showing the preferred embodiment.
Figure 10G:
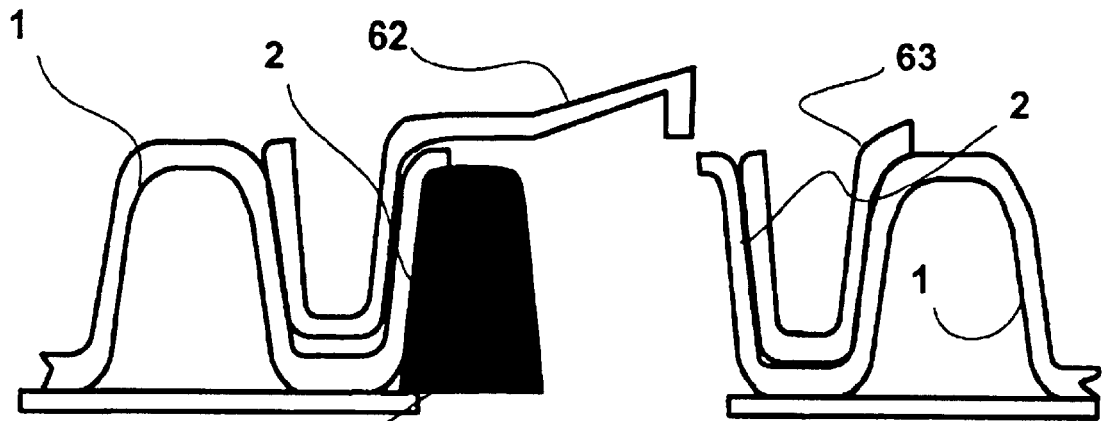
FIG. 10G is a cross sectional view of adjacent ends of dual wall corrugated plastic pipe sections having flanges formed from circumferential portions of end corrugations, wedge shaped gasket formed to match the internal surface of the end corrugations and bell and spigot flange clamp.
Figure 10H:
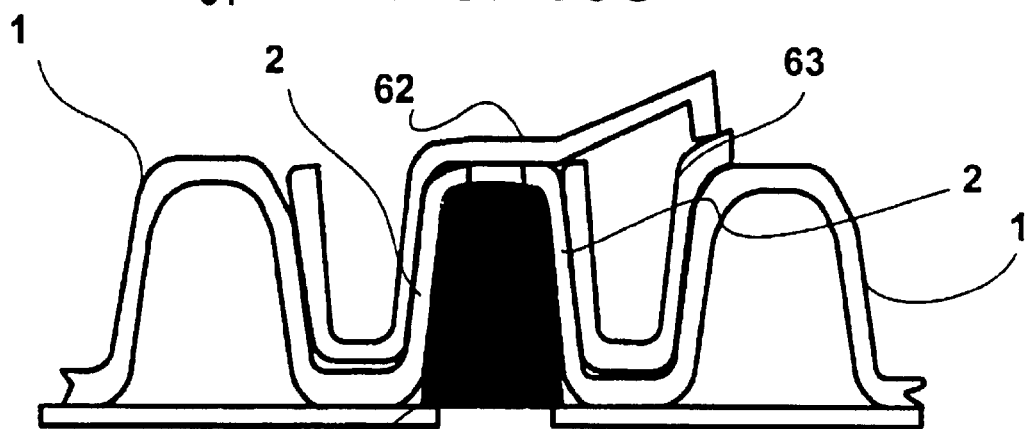
FIG. 10H is a cross sectional view of two end sections of dual wall corrugated plastic pipe, a wedged shaped gasket formed to match the internal surface of the end corrugations, bell and spigot flange clamp before final assembly.
Figure 10I:
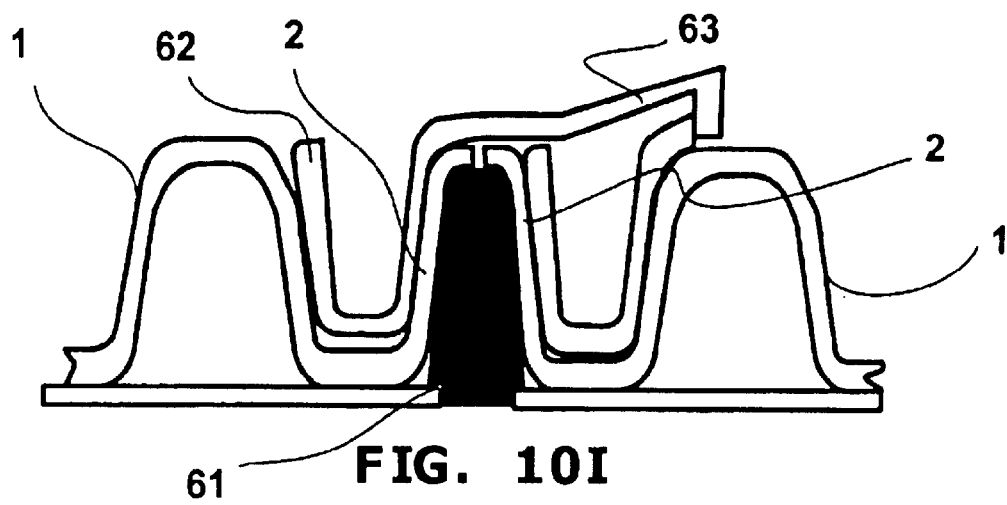
FIG. 10I is a cross sectional view of a section of an assembled soil tight and water tight joint composed of two flanged ends of dual corrugated palstic pipe, a wedged shaped gasket formed to match the internal surface of the end corrugations and bell and spigot flange clamp.

FIGS. 10A, 10B and 10C show the construction of a soil tight and water tight joint between two sections of dual wall corrugated plastic pipe 1 with flange ends formed from a circumferential portion of the end corrugations. This joining is accomplished by inserting a wedge shaped gasket 16 between abutting flange ends of dual wall corrugated plastic pipe and squeezing the gasket with the circular flange clamp 6. In this preferred embodiment, the flange clamp and gasket is designed so that the gasket compresses axially between 20% and 25% when the clamp is closed.

EXAMPLE II

Figure 11A:
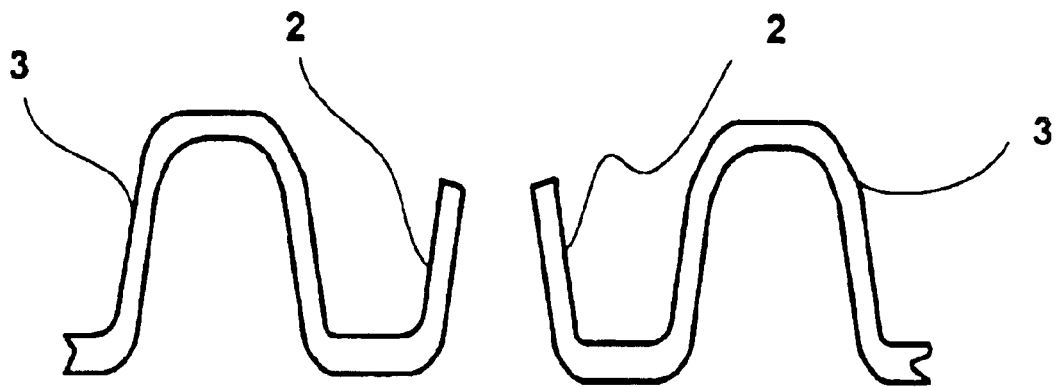
FIG. 11A is cross sectional view of two end sections of single wall corrugated plastic pipe in which a flange is formed from a circumferential portion of the end corrugations.
Figure 11B:
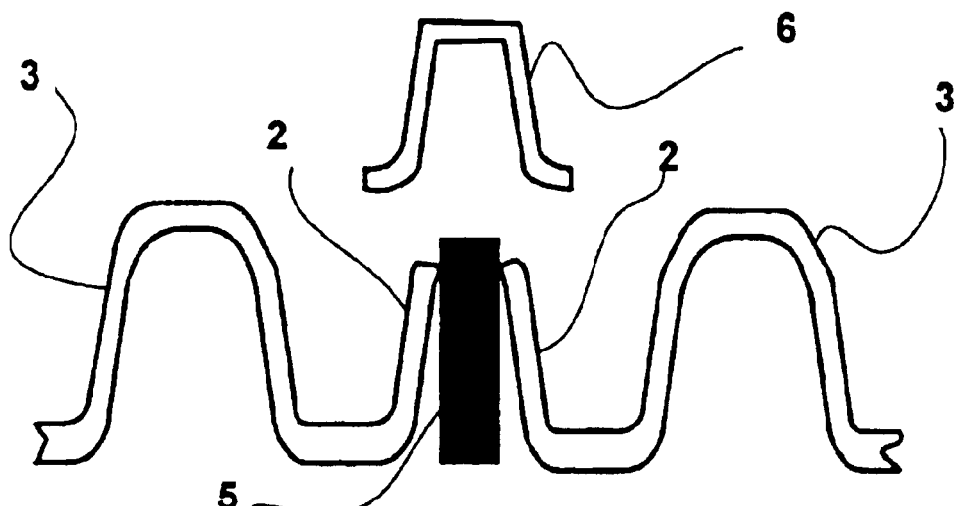
FIG. 11B is a cross sectional view of two end sections of single wall corrugated plastic pipe, a flat gasket and a circular flange clamp before final assembly of a joint.
Figure 11C:
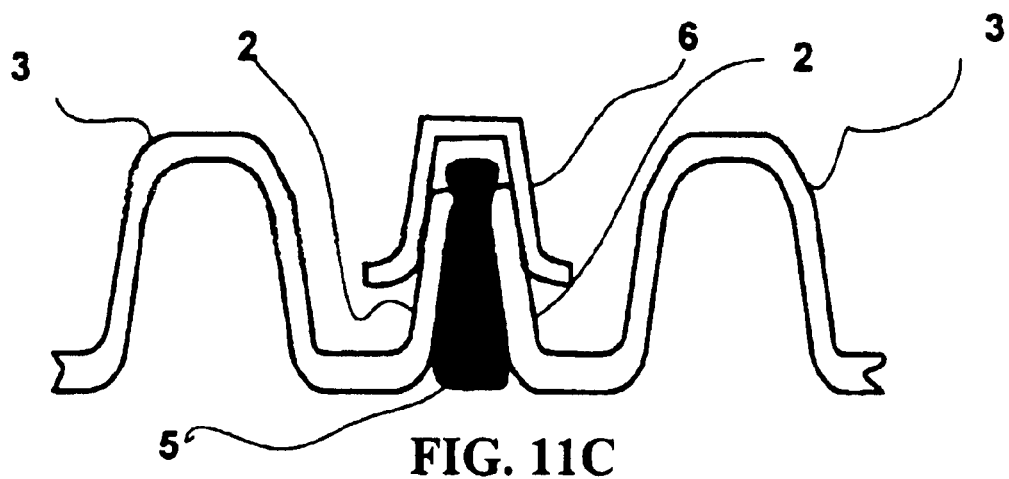
FIG. 11C is a cross sectional view of a section of an assembled soil tight and water tight joint composed of two flange ends of single wall corrugated plastic pipe, a flat gasket and a circular flange clamp.

In this second example, the method and design of soil-tight and water tight joining of single wall corrugated plastic pipe is demonstrated for a second time. FIG. 11A shows two sections of single wall corrugated plastic pipe 3 with a flange 2 formed by a circumferential portion of an end corrugation. FIG. 11B shows the components for fabricating a water tight joint; the single wall plastic pipe 3 with flange 2, the flat gasket 5 and the circular flange clamp 6 in the open position. FIG. 11C shows the assembled joint wherein the circular flange clamp 6 is closed causing the gasket 5 to compress. Flange 2 is in compression avoiding tensile stresses that enhance stress cracking.

EXAMPLE III

Figure 12A:
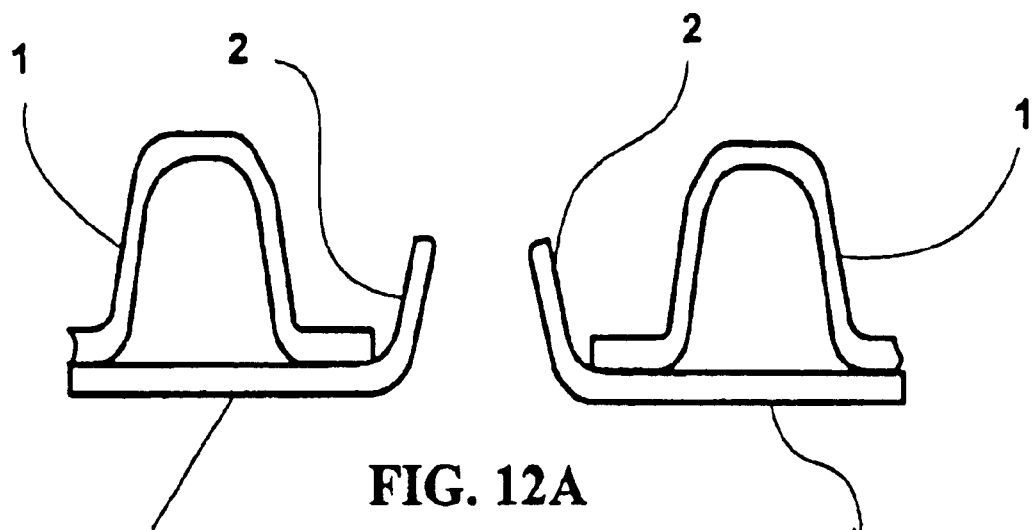
FIG. 12A shows a cross sectional view of two end sections of adjacent dual wall corrugated plastic pipes in which a flange is formed from the liner at the pipe end.
Figure 12B:
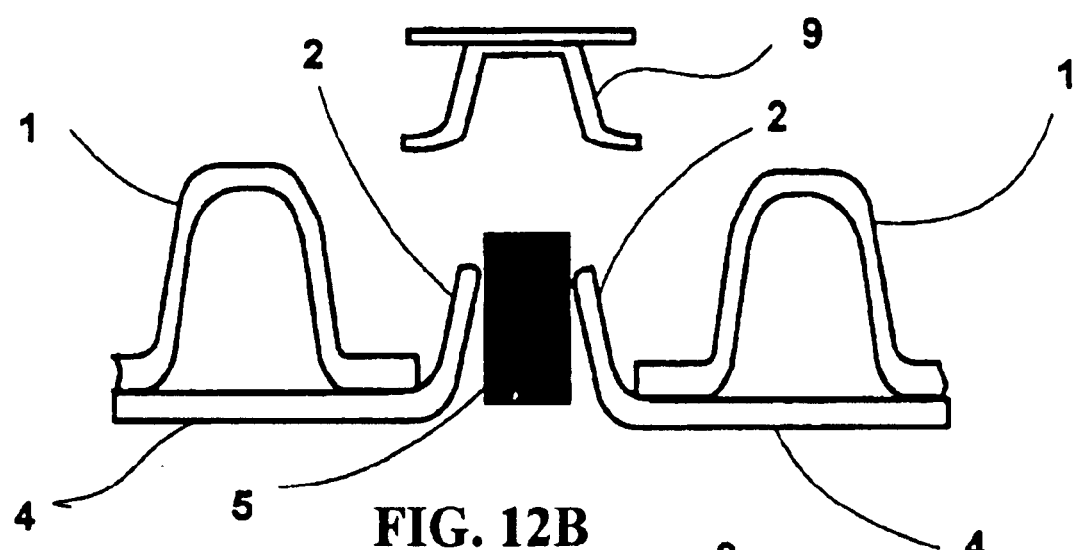
FIG. 12B is a cross sectional view of sections of the ends of two dual wall corrugated plastic pipes with flanges formed from the liner at the pipe ends, a flat gasket and a circular flange clamp before final assembly of a joint.
Figure 12C:
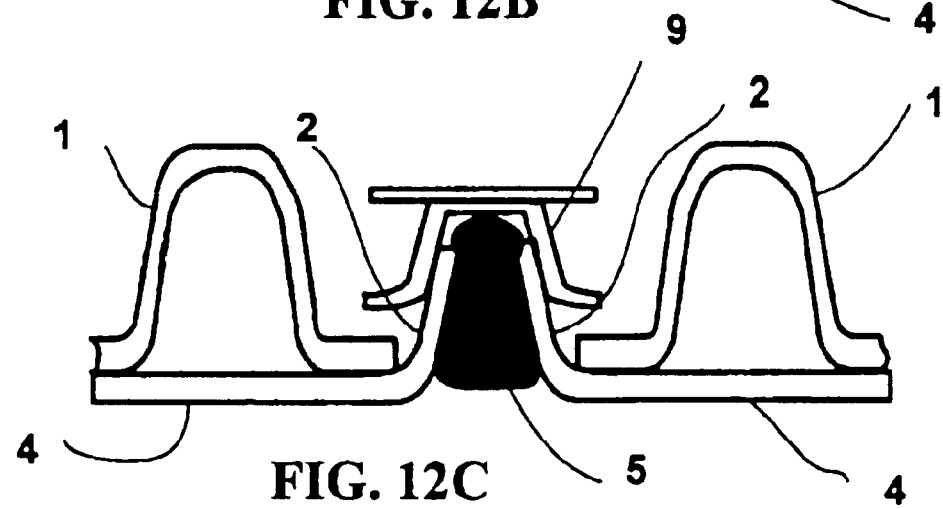
FIG. 12C is a cross sectional view of a section of an assembled joint composed of two ends of adjacent dual wall corrugated plastic pipes having flanges formed from the liner of the pipes at the pipe ends, a flat gasket and a circular flange clamp.

This example shows an alternate means of applying the disclosed invention to the water tight joining of dual wall corrugated plastic pipe. FIG. 12A shows two sections of dual wall plastic pipe 1 having transverse corrugations and flanges 2 at the pipe end formed from the liner. FIG. 12B shows the components for fabricating a water tight joint; the dual wall plastic pipe 1 with flange 2 formed from the liner 4, the flat gasket 5 and the circular flange clamp 6 in the open position. FIG. 12C shows the assembled joint wherein the circular flange clamp 9 is closed causing the gasket 5 to compress.

EXAMPLE IV

Figure 13A:
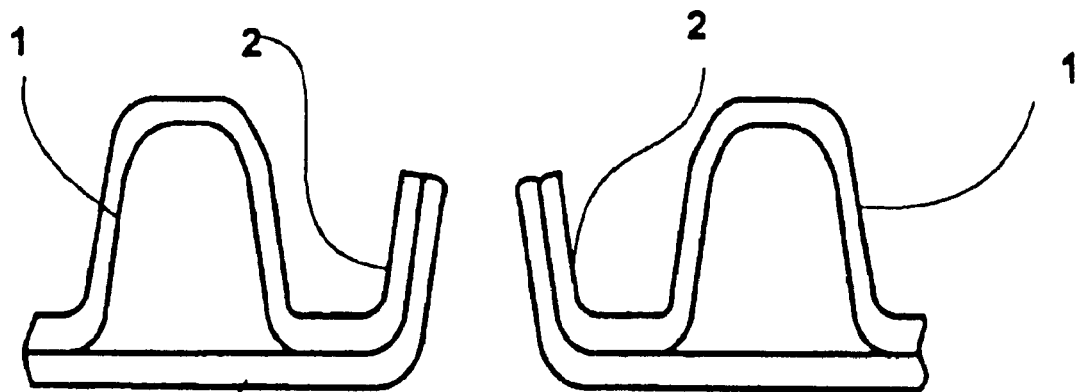
FIG. 13A is cross sectional view of sections of two ends of dual wall corrugated plastic pipes having end flanges formed from a portion of the end corrugation and the liner at the pipe end.
Figure 13B:
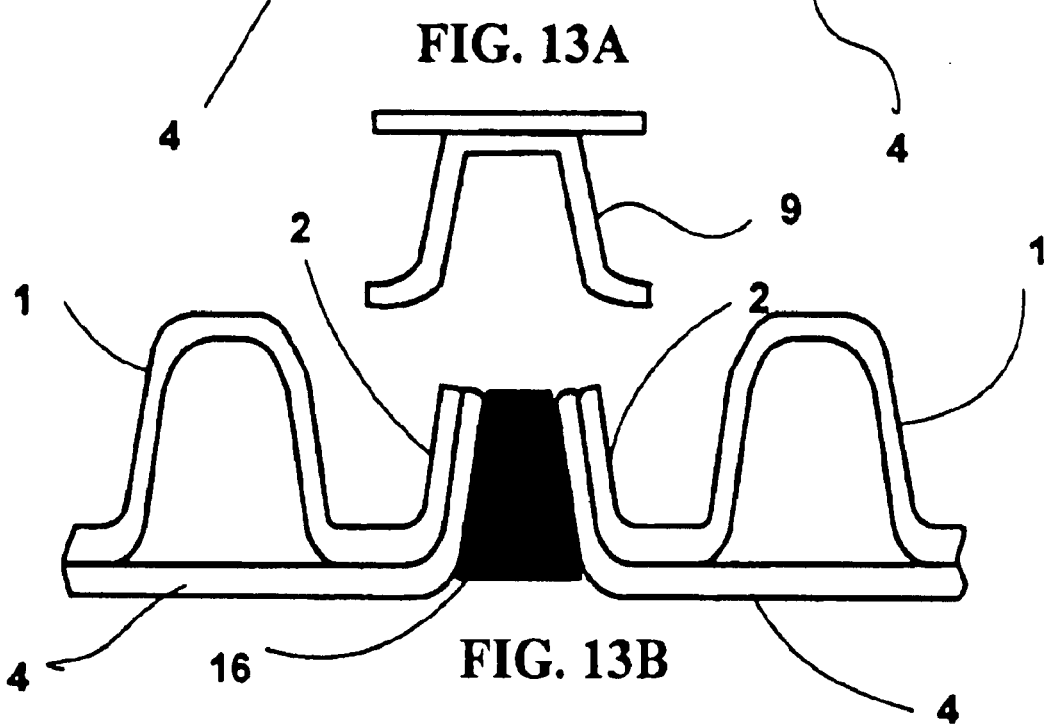
FIG. 13B is a cross sectional view of sections of two ends of dual wall corrugated plastic pipes in which a flange is formed from a portion of the end corrugation and the liner at the pipe end, a flat gasket and a circular flange clamp before final assembly of a joint.
Figure 13C:
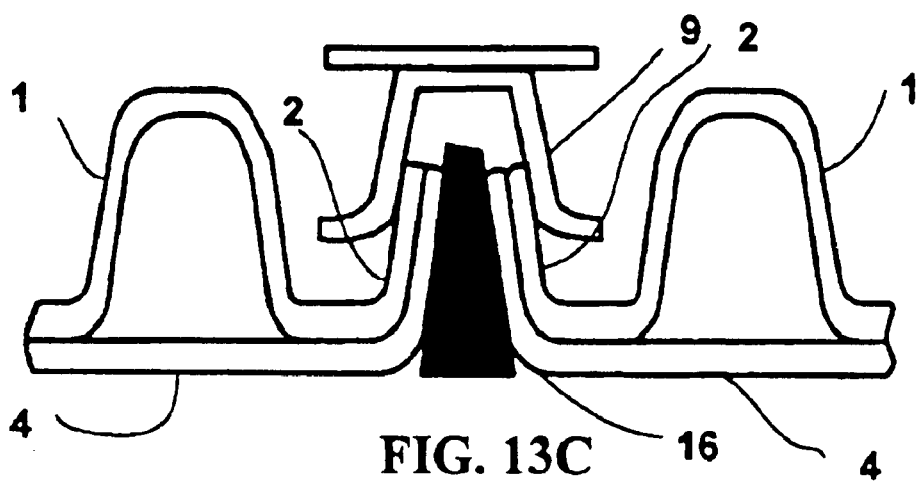
FIG. 13C is a cross sectional view of a section of an assembled joint composed of two ends of dual wall corrugated plastic pipe in which a flange is formed from a portion of an end corrugation and the liner at the pipe end, a flat gasket and a circular flange clamp.

This fourth example demonstrates the method of applying the invention disclosure to dual wall corrugated plastic pipe 1 having a flange 2 at its end formed by both the liner 4 and the corrugation as shown in FIG. 13A. FIG. 13B shows the components for fabricating a soil tight and water tight joint; the dual wall plastic pipe 1 with flange 2, a wedge shaped gasket 7 and the circular flange clamp 9.

EXAMPLE V

Figure 14A:
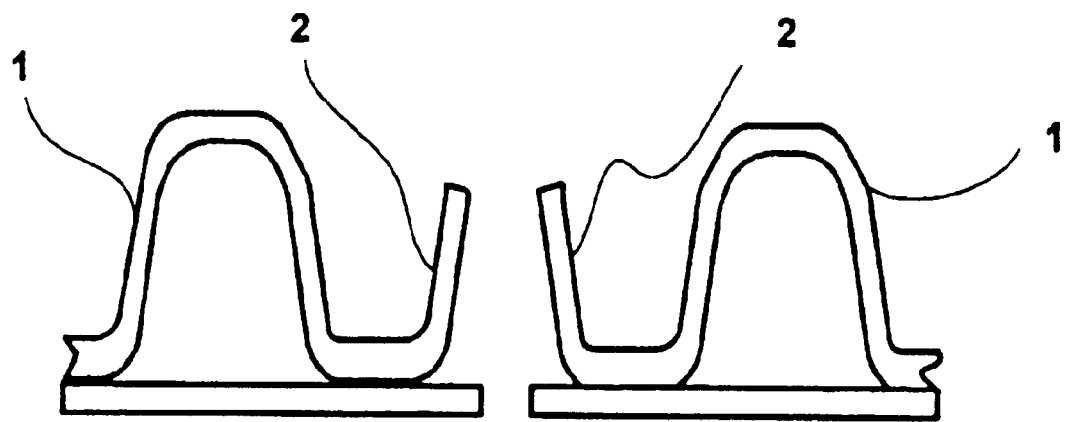
FIG. 14A is cross sectional view of sections of two ends of dual wall corrugated plastic pipe having a flange formed from a circumferential portion of the end corrugations.
Figure 14B:
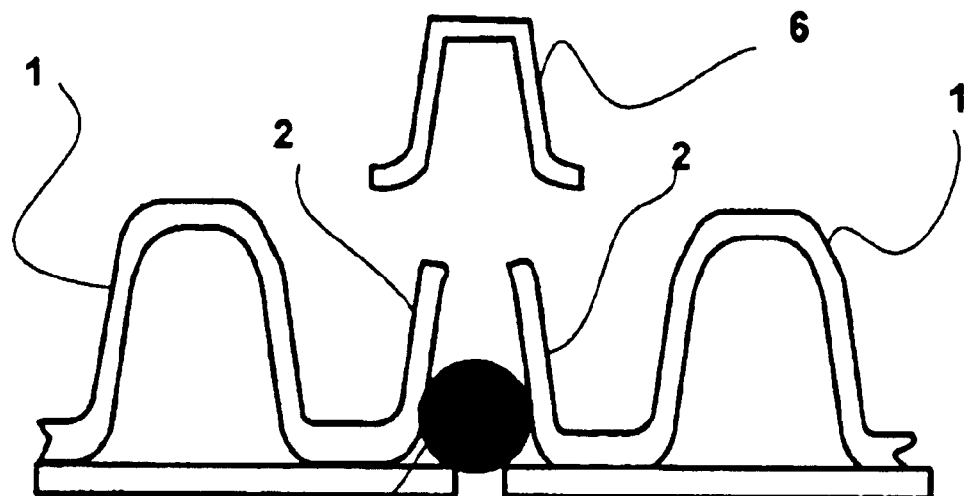
FIG. 14B is a cross sectional view of two sections of ends of dual wall corrugated plastic pipe, an "O" ring gasket and a circular flange clamp before final assembly of a joint.
Figure 14C:
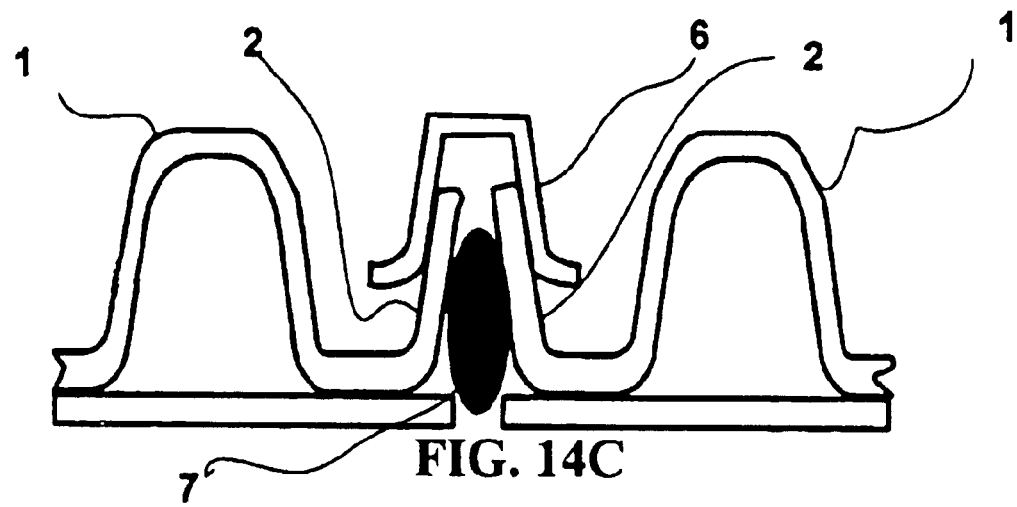
FIG. 14C is a cross sectional view of a section of an assembled joint composed of two flange ends of dual wall corrugated plastic pipe, an "O" ring gasket and a circular flange clamp.

The fifth example demonstrates in FIGS. 14A, 14B and 14C, the method of applying the invention disclosure to dual wall corrugated plastic pipe 1 having a flange end 2, an "O" ring gasket 7 and circular clamp 6.

EXAMPLE VI

Figure 15A:
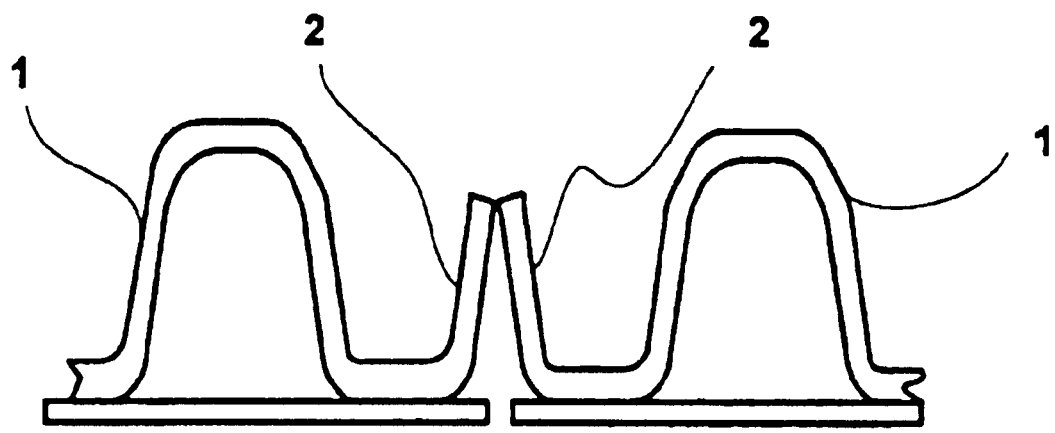
FIG. 15A is cross sectional view of sections of two ends of dual wall corrugated plastic pipe in which a flange is formed from a circumferential portion of the end corrugations of the respective pipes.
Figure 15B:
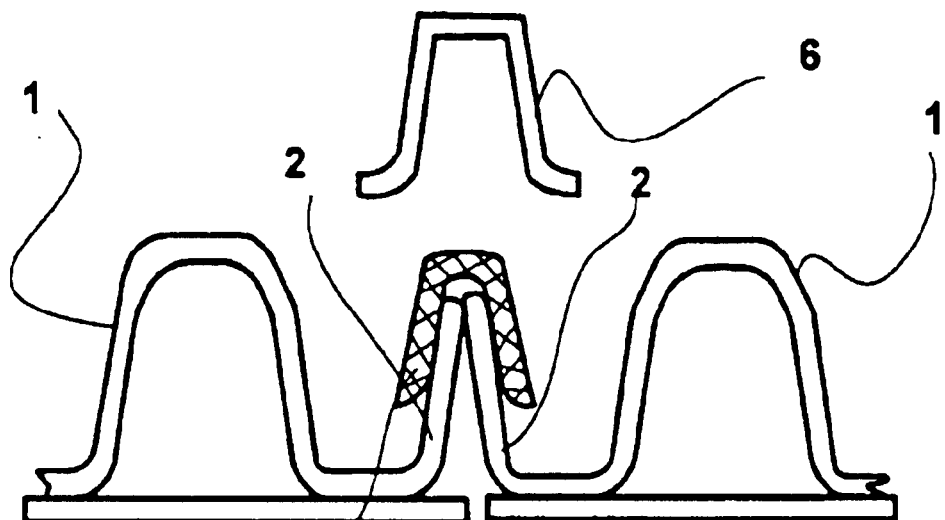
FIG. 15B is a cross sectional view of two sections of ends of dual wall corrugated plastic pipe, an external inverted "V," gasket and a circular flange clamp before final assembly of a joint.
Figure 15C:
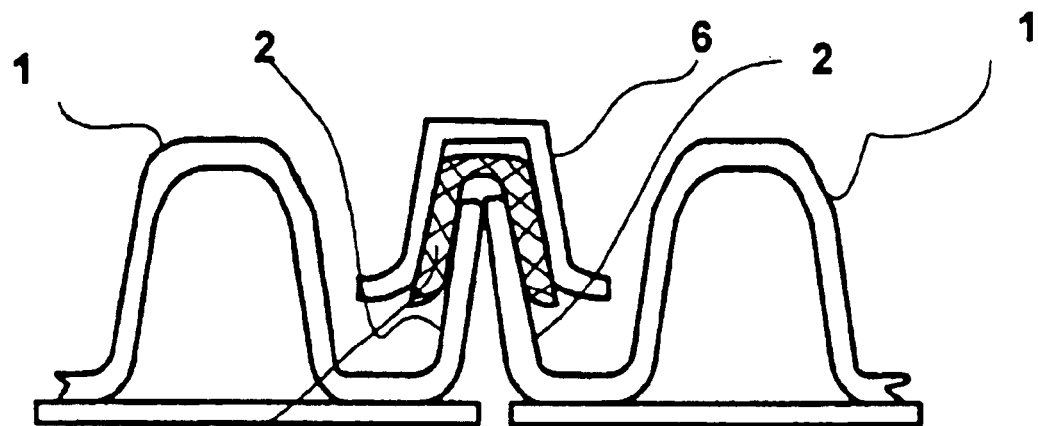
FIG. 15C is a cross sectional view of a section of an assembled joint composed of two flange ends of dual wall corrugated plastic pipe, an external inverted "V" gasket and a circular flange clamp.

The sixth example demonstrates in FIGS. 15A, 15B and 15C, the method of soil tight and water tight joining of sections of dual wall corrugated plastic pipe 1 by compressing an external gasket 13 that straddles the flange ends 2 and is compressed by circular flange clamp 6.

EXAMPLE VII

Figure 16A:
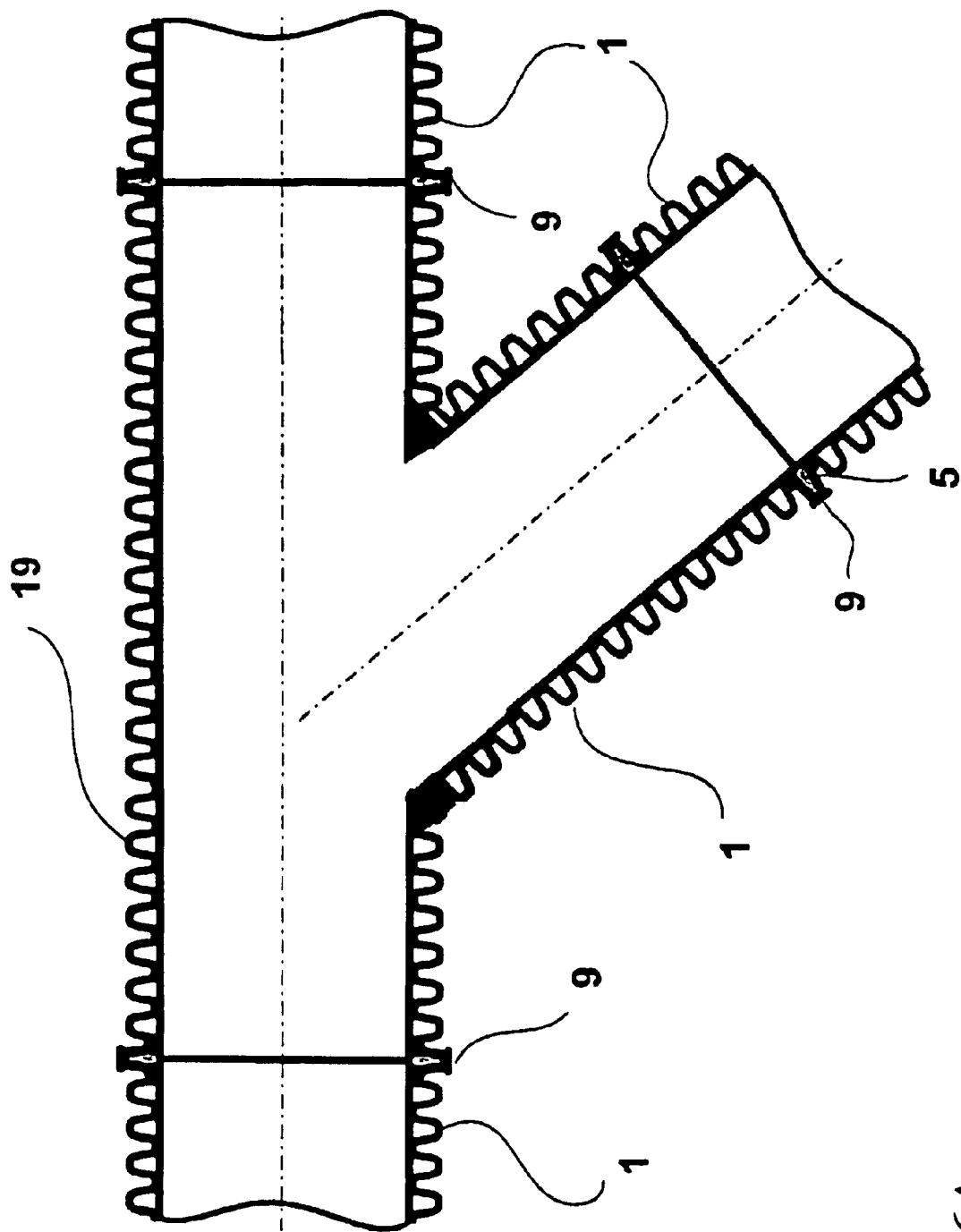
FIG. 16A is a cross sectional view of a dual wall corrugated plastic "Y" fabricated fitting with end flanges joined to sections of dual wall corrugated polyethylene pipe having corresponding end flanges.

FIG. 16A represents an embodiment of this invention wherein dual wall corrugated plastic fabricated "Y" fitting are joined to sections of dual wall corrugated plastic pipe by inserting a gasket 5 between the end flanges and by utilizing circular flange clamps 9. Although this embodiment is portrayed by using a "Y" fitting, the invention can be applied equally well to most fittings including but not limited to "T", 4 way, elbows and angle fittings.

EXAMPLE VIII

Figures 16B, 16C:
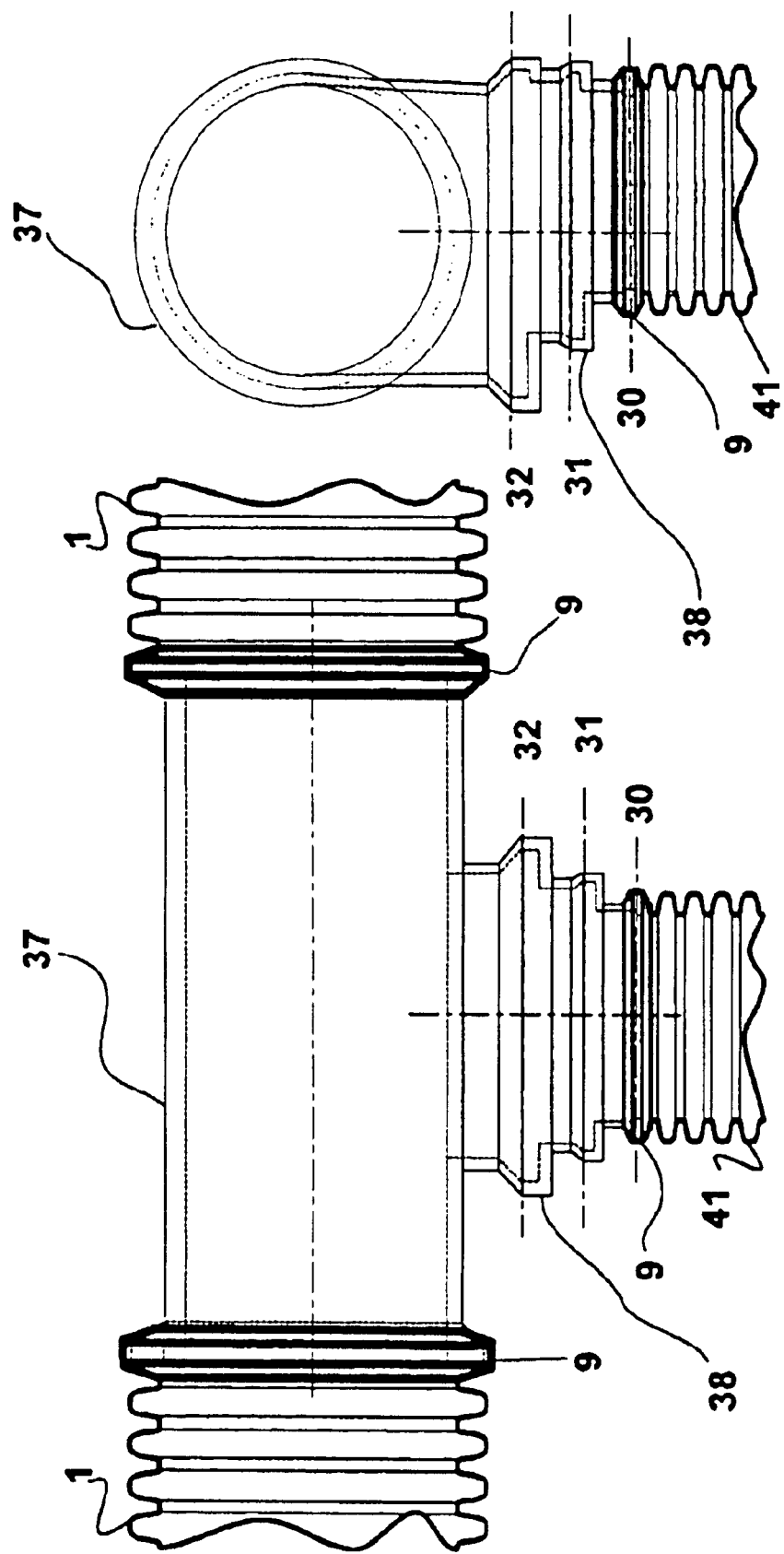
FIGS. 16B and 16C respectively show the front and end views of an assembly of a molded stepped reducing "T" fitting joining two in-line pipe sections of dual wall corrugated plastic pipe to a smaller diameter dual wall corrugated plastic pipe.

FIGS. 16B and 16C respectively show front and side views of an embodiment of this invention wherein a molded in-line reducing "T" fitting 37 fitting that couples two sections of dual wall corrugated plastic pipe 1 and an integral, stepped, off-set, selectable pipe size, reducer coupling 38 to a corrugated plastic pipe 41 having the same or smaller pipe size as the corrugated plastic pipe 1. All joints are comprised of a gasket between the end flanges that are sealed by circular flange clamps 9 as depicted in FIGS. 5A, 5B and 5C. This design is unique in the fact that it discloses an integral, off-set, selectable size, reducer coupling 38 for soil and water tight joining of dual wall corrugated plastic pipe. The integral reducer coupling comprises a series of flange diameters wherein the flange diameter of choice is selected by cutting the reducer coupling 38 at the plane that matches the size requirement. In this example the reducer coupling was cut at plane 30. A field cut at plane 31 and 32 offer larger diameter possibilities. Please note that the axes of the reduced fitting options are off set so that the drainage into and out of the pipe will always be at the bottom or top of the pipe. The integral selectable reducer coupling 38 need not be offset and the selectable reducing diameters could be concentric. This invention has the advantage that the pipe manufacturer need only produce one universal fitting wherein the customer can field select the reduced pipe size by simply cutting off the stepped reducer coupling at the desired flange diameter.

EXAMPLE IX

FIGS. 16D and 16E respectively show front and side views of an embodiment of this invention wherein a molded selectable diameter, stepped off-set reducer coupling 40 is utilized to join a fabricated in-line reducing "T" fitting to two corrugated plastic pipe sections 1 and a section of dual wall corrugated plastic pipe 41 having a flange diameter smaller than the connecting fitting. This is accomplished by inserting a gasket between the end flanges and by utilizing circular flange clamps 9 as indicated previous in FIGS. 5A, 5B and 5C. This design is unique in the fact that it discloses a design and method for joining standard fabricated fitting to corrugated flange end plastic pipe sections by means of a molded selectable size, off-set reducer coupling. The selectable size feature is achievable by cutting the reducer at the plane that matches the size requirement. In this example the reducer was cut at plane 35. A field cut at plane 36 offers a larger diameter possibility. Please note that the axes of the reduced fitting options are off set so that the drainage into and out of the pipe will always be at the bottom or top of the pipe. This invention has the advantage that the pipe manufacturer need only produce one size diameter for each fitting type and provide a molded selectable stepped offset reducer coupling that the customer can field cut to select the proper pipe size.

Figure 17:
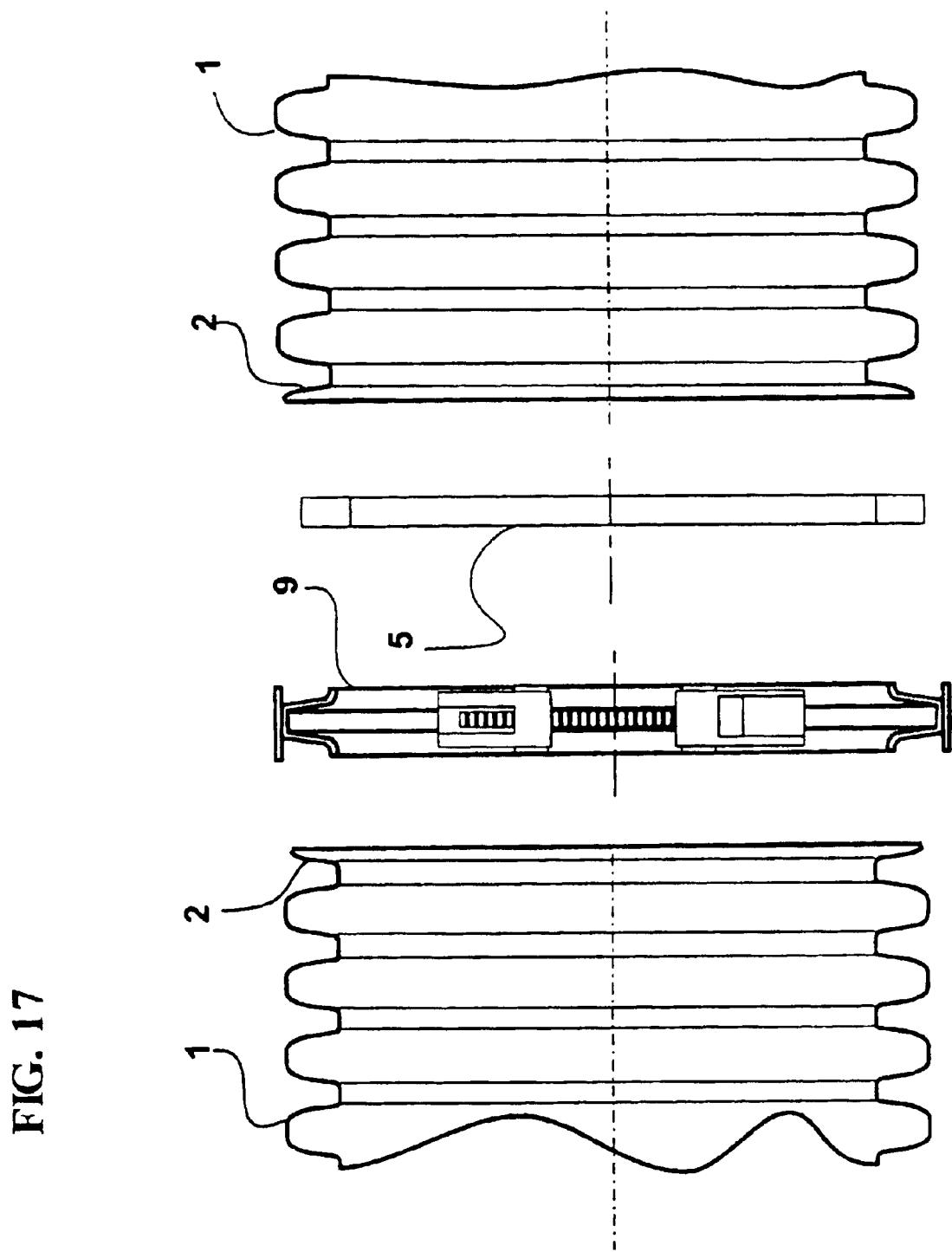
FIG. 17 shows a front view of a kit for providing a water tight seal including a gasket and a circular flange clamp for forming the joint and seal, and two pipe sections having end flanges with which the kit is used.
Figure 18:
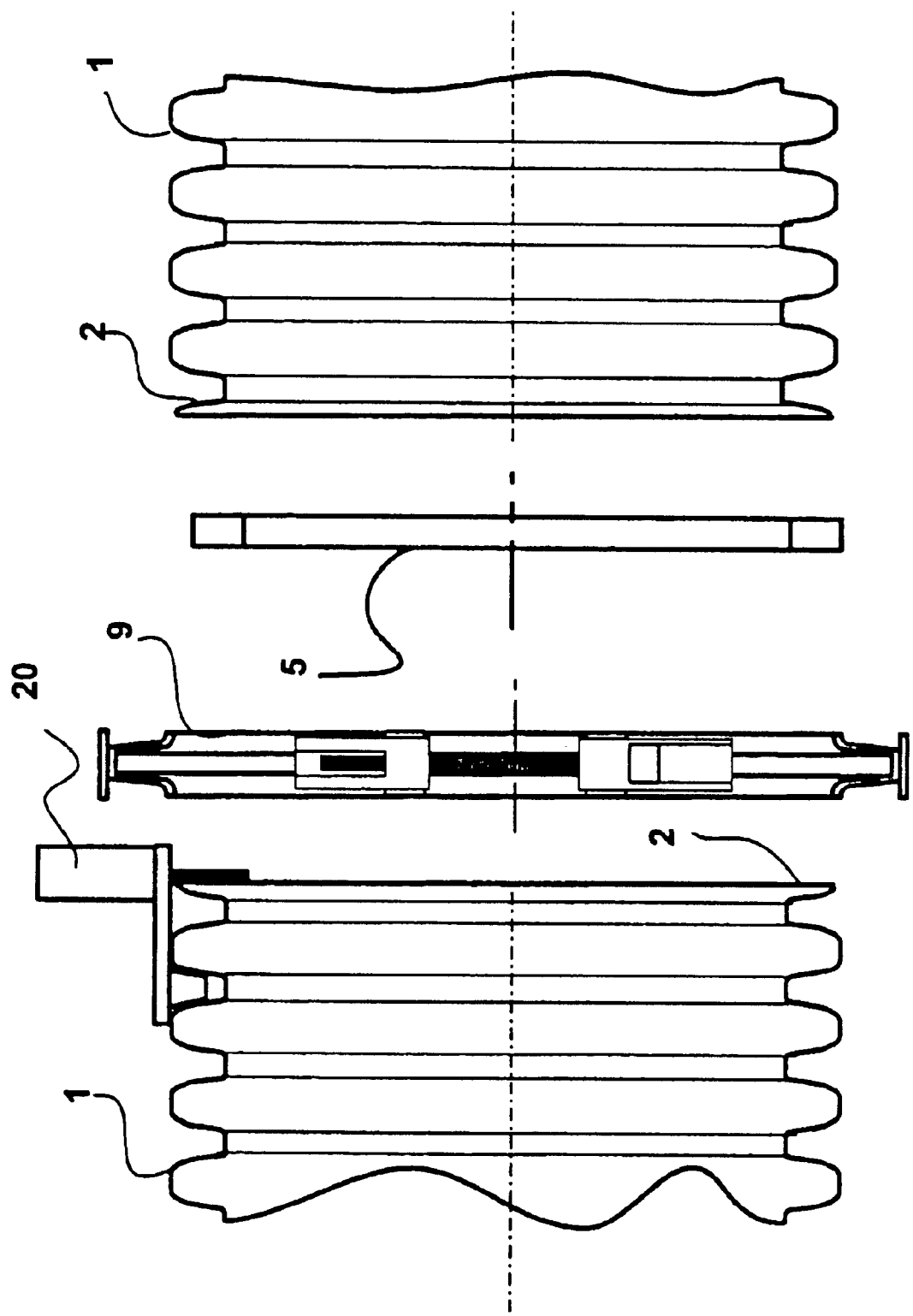
FIG. 18 shows a front view of a kit for providing a water tight seal between corrugated plastic pipe sections including a gasket, a circular flange clamp, a router, and a router guide for forming the flange at the end of the respective two pipe sections to be joined at their end flanges.
Figure 19:
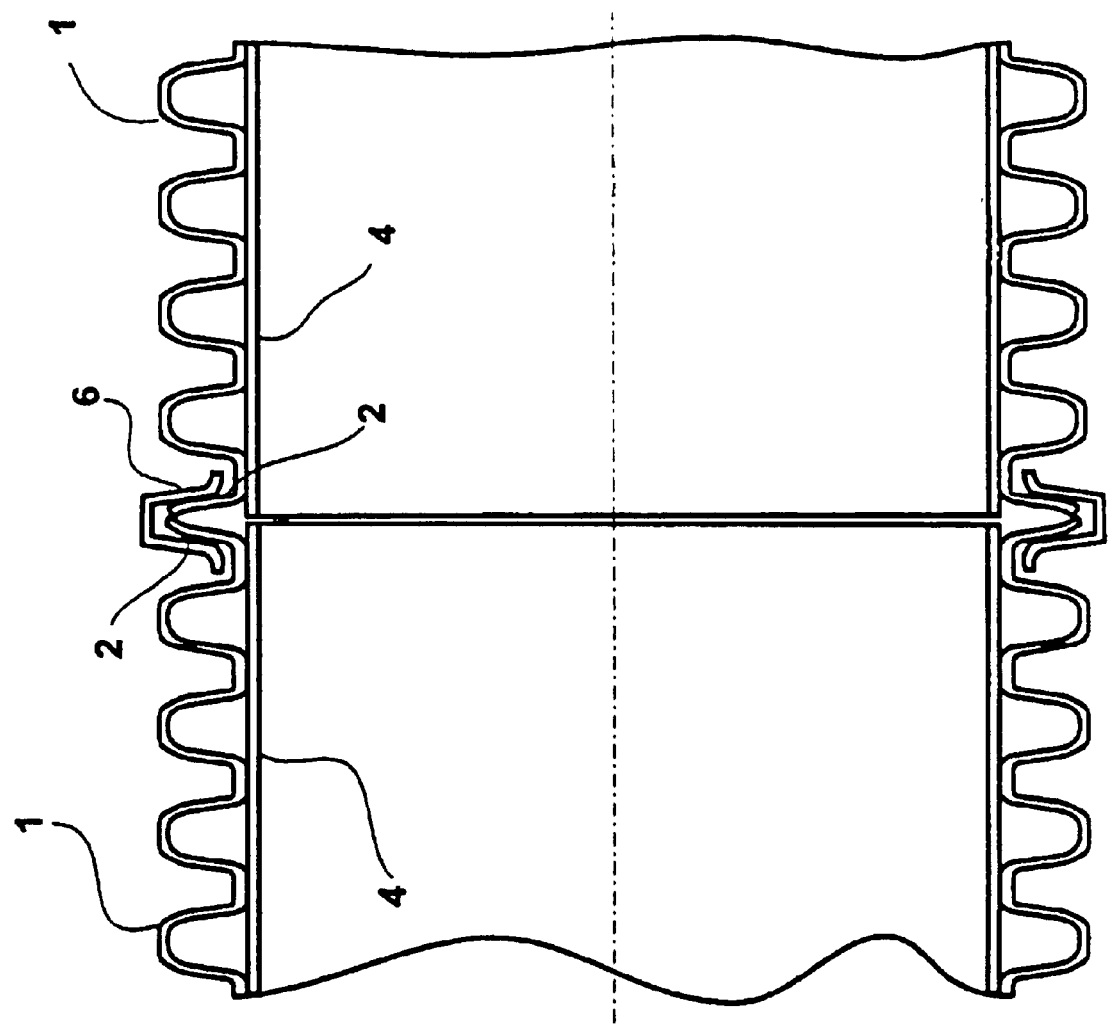
FIG. 19 shows a structural joint formed by pipe or fitting end flanges and clamp without a gasket between the facing flanges.

A kit shown in FIG. 17 is used in the field to provide a joint between adjacent sections of corrugated plastic pipe 1 or a section of corrugated plastic pipe having essentially similar cross-sections and a pipe or fitting having a flanged end. The kit includes a gasket 5 having a cross-sectional shape in a correspondence with the sections to be joined and a circular flange clamp having a cross sectional shape such that the clamp 9 is capable of straddling the flanges at the end sections to be joined. FIG. 18 shows a kit that includes a portable router, saw, or other suitable cutting device 20 and guide fixture for making field cuts in the end section of the corrugated pipe to provide a flange at the end thereof by forming a radially extending circumferential portion of a section of a corrugation or the liner of the corrugated pipe.

Having thus described the invention in detail, those skilled in the art will appreciate that, given the present disclosure; modifications may be made to the invention without departing from the spirit of the inventive concept herein described. Rather, it is intended that the scope of the invention be determined by the appended claims.

What is claimed is:

1. An assembly of collinearly aligned sections of large diameter corrugated plastic pipes that are buried in a trench comprising a plurality of separate lengths of connected pipes wherein: A) the end of a first pipe length abuts the end of a second pipe length, and each pipe length includes a flange radially extending from the abutting ends of the pipe lengths, and each flange radially extends from the valley of the corrugation in the pipe immediately preceding the end and does not transversely extend into a crest, and B) a circumferential clamp is disposed about the abutting flanges to form a joint between the pipe lengths, the clamp having sides adapted to embrace the sides of the flanges and the sides of the clamp do not radially extend to the valleys of the corrugations in the pipes immediately adjacent the flanges.

2. The assembly of claim 1 in which the clamp includes an interior channel providing an inside clearance between the inside radius of the clamp and the sides of the flanges.

3. An assembly of collinearly aligned sections of large diameter corrugated plastic pipes that are buried in a trench comprising a plurality of separate lengths of connected pipes, wherein: A) the end of a first pipe length faces the end of a second pipe length, and 1) each pipe length includes a flange radially extending from each facing end of the pipe and 2) each flange is formed from a circumferential portion of an end corrugation of the pipe and extends radially from the valley of the corrugation in the pipe immediately preceding the end and the end portion of the flange does not substantially extend along or parallel to the pipe length; B)

a circumferential clamp is disposed about the facing flanges to form a joint between the pipe lengths, the clamp having sides adapted to embrace the sides of the flanges and the sides of the clamp do not radially extend to the valleys of the corrugations in the pipes immediately adjacent the flanges; and C) a gasket is interposed between the flanged ends of the pipe lengths.

4. The assembly of claim 3 in which the gasket, in longitudinal cross section, has a shape essentially in correspondence with the facing flanges of pipe lengths.

5. The assembly of claim 3 in which the gasket, in longitudinal cross section, is wedge shaped.

6. The assembly of claim 3 in which the gasket comprises an "O" ring.

7. The assembly of claim 1 or 3 in which the clamp provides a compressive force to the flanges and the relationship of the clamp and the flanges is such that the diameters of the damp and the flanges, when the damp is tightened, provide a) a clearance between the outside circumference of the flanges and the inside circumference of the clamp and b) a clearance between the sides of the clamp and the valleys of the corrugations in the pipes immediately adjacent the flanges.

8. The assembly of claim 7 in which the sides of the clamp form a channel and the channel includes opposite sides extending radially toward each other from the inside radius of the clamp.

9. The assembly of claim 7 in which the sides of the clamp form a channel and the channel includes opposite sides radially extending away from each other from the inside radius of the clamp.

10. The assembly of claim 1 or 3 in which the inside diameter of the circumference of the clamp is greater than the outside diameters of the flanges joined.

11. The assembly of claim 1 or 3 in which the pipe lengths include a plastic liner and a portion of the flange is formed from the material of the liner.

12. The assembly or claim 1 or 3 in which the pipes are formed from HDPE.

13. The assembly of claim 1 or claim 3 in which the clamp is formed from a stainless steel.

14. The assembly of claim 1 or 3 in which an additional length of pipe having a flanged end is disposed in facing relationship with a fitting having a cooperative flange and an additional clamp is disposed about the flanged end of the additional pipe and the flange of the fitting to form a joint.

15. A system for joining collinearly aligned sections of large diameter corrugated plastic pipes comprising: forming a circumferential flange integrally and radially extending from the valley of the corrugation at the end of a first pipe section, forming a circumferential flange integrally and radially extending from the valley of the corrugation at the end of a second pipe section such that the end portion of the flange does not substantially extend along or parallel to the pipe length; positioning the flange at the end of the first pipe section in a facing relationship with the flange at the end of the second pipe section, joining the facing flanges with a circumferential clamp having sides that do not radially extend to the valleys of the corrugations in the pipes immediately adjacent the flanges, the clamp having an interior channel providing an inside clearance between the inside radius of the clamp and the outer circumference of the flanges, and burying the pipe sections in a trench.

16. The system of claim 15 in which the pipe sections are formed from HDPE.

17. The system of claim 15 including positioning a gasket in alignment with and between the facing flanges before the flanges are joined by the clamp.

18. A method for joining collinearly aligned sections of large diameter corrugated plastic pipes comprising: forming a circumferential flange integrally and radially extending from the valley of the corrugation at the end of a first pipe section such that the end portion of the flange does not substantially extend along or parallel to the pipe length, forming a circumferential flange integrally and radially extending from the valley of the corrugation at the end of a second pipe section such that the end portion of the flange does not substantially extend along or parallel to the pipe length, positioning the flange at the end of the first pipe section in a facing relationship with the flange at the end of the second pipe section, and joining the facing flanges with a circumferential clamp having sides that do not radially extend to the valleys of the corrugations in the pipes immediately adjacent the flanges, and burying the pipe sections in a trench.

19. The method of claim 18, including inserting a gasket in alignment with the flanges as the flanges are positioned in the facing relationship, and wherein applying the clamp compresses the assembly of the gasket and flanges and the clamp allows an internal radial clearance between the clamp and the outside circumference of the flanges.

20. The method of claim 18 wherein the pipe sections include a liner.

21. The method of claim 18 for joining HDPE corrugated plastic pipe.

22. The method of claim 18 in which the forming of the flanges of the first and second pipe sections includes cutting the sections from a given length of pipe at a longitudinal location between the valley of the end corrugation of the given length of pipe and the crest of the end corrugation.

23. A kit of collinearly aligned sections of large diameter corrugated plastic pipes provided in predetermined lengths that are to be buried in a trench in which 1) a plurality of separate lengths of pipe are connected to each other or 2) a length of pipe is connected to a fitting, comprising a first large diameter corrugated plastic pipe having a flange radially extending from the valley of the corrugation in the pipe immediately preceding the end of the pipe such that the end portion of the flange does not substantially extend alone or parallel to the pipe length, and a second large diameter corrugated plastic pipe or fitting having a flange immediately preceding the end of the pipe or fitting, the flanges adapted to abut one another in facing relationship, a peripheral clamp for disposition about the abutting flanges to form a joint between 1) the pipe lengths or the oboe length and the fitting, the clamp having sides adapted to embrace the sides of the flanges and the sides of the clamp do not radially extend to the valleys of the corrugations in the pipes or pipe and fitting immediately adjacent the flange when the clamp is disposed about the flanges.

24. The kit of claim 23 in which at least one pipe length or fitting includes a compressible annular elastomeric gasket having a surface profile essentially corresponding to the surface area of the pipe's or the fitting's flange.

25. The kit of claim 24 in which the gasket is an "O" ring having first and second side surfaces for disposition between the flanges and the surfaces of the "O" ring facing the flanges correspond to the surfaces of the flanges at the pipe or fitting ends.

26. The kit of claim 23, claim 24, or claim 25 including a field cut length of pipe.

27. The kit of claim 23 in which the first pipe is an HDPE pipe.

28. The kit of claim 27 in which the clamp is formed from a stainless steel.

29. The kit of claim 23 further including a second fitting having a flanged end cooperative with a flange at an end of an additional pipe and a second clamp for disposition with respect to the flange of the second fitting and the flange of the additional pipe.

* * * * *

UNITED STATES PATENT AND TRADEMARK OFFICE
CERTIFICATE OF CORRECTION

| | |
|---|---|
| PATENT NO. | : 6,938,933 B2 |
| APPLICATION NO. | : 10/698601 |
| DATED | : September 6, 2005 |
| INVENTOR(S) | : Starita |

It is certified that error appears in the above-identified patent and that said Letters Patent is hereby corrected as shown below:

Column 13, Line 17 "of the damp" should read --of the clamp--;

Column 13, Line 17 "when the damp" should read --when the clamp--;

Column 14, Line 41 "alone" should read --along--; and

Column 14, Line 47 "oboe" should read --pipe--.

Signed and Sealed this

First Day of May, 2007

JON W. DUDAS
*Director of the United States Patent and Trademark Office*